(12) United States Patent
Kanzaki et al.

(10) Patent No.: US 6,546,156 B1
(45) Date of Patent: Apr. 8, 2003

(54) IMAGE PROCESSING DEVICE

(75) Inventors: Yoshiharu Kanzaki, Kawasaki (JP);
Mikihiro Okamoto, Kawasaki (JP);
Morito Shiohara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/225,328

(22) Filed: Jan. 5, 1999

(30) Foreign Application Priority Data

Jul. 30, 1998 (JP) .......................................... 10-215342

(51) Int. Cl.$^7$ .......................... G06K 9/32; G06K 9/44; H04N 11/04
(52) U.S. Cl. .................. 382/298; 382/293; 382/258; 348/439.1; 348/430.1
(58) Field of Search .............................. 382/298, 295, 382/293, 291, 282, 277, 259, 258, 257, 256, 243, 236, 216, 191, 190, 187; 358/3.2, 3.3; 348/439.1, 430.1, 390.1, 387.1

(56) References Cited

U.S. PATENT DOCUMENTS

| | | | | | |
|---|---|---|---|---|---|
| 5,043,811 | A | * | 8/1991 | Yasuhiro | 358/140 |
| 5,351,137 | A | * | 9/1994 | Kato et al. | 358/457 |
| 5,640,202 | A | * | 6/1997 | Kondo et al. | 348/222 |
| 5,689,582 | A | * | 11/1997 | Murakami | 382/176 |
| 5,872,902 | A | * | 2/1999 | Kuchkuda et al. | 395/130 |
| 6,084,637 | A | * | 7/2000 | Oku et al. | 348/445 |
| 6,335,760 | B1 | * | 1/2002 | Sato et al. | 348/397.1 |

\* cited by examiner

Primary Examiner—Bhavesh Mehta
Assistant Examiner—Yosef Kassa
(74) Attorney, Agent, or Firm—Staas & Halsey LLP

(57) ABSTRACT

An image processing device having an improved image processing speed and capable of detecting an object at high speed. Where frames are thinned out for real-time processing during frame processing of an image signal, line interval expanding unit expands the interval between lines of the image signal by an amount corresponding to the number of the frames thinned out. Image processing unit performs line processing of the lines whose interval has been expanded, according to pipeline control.

32 Claims, 23 Drawing Sheets

IMAGE PROCESSING DEVICE

BACKGROUND OF THE INVENTION

(1) Field of the Invention

The present invention relates to an image processing device, and more particularly, to an image processing device for processing an image signal in real time for the detection of an object and for image recognition.

(2) Description of the Related Art

Image recognition technique is a technique for detecting the presence of an object based on an image acquired by a CCD camera or the like and analyzing the contents of the image.

In ITS (Intelligent Transport System: expressway traffic system), image recognition technique is used, for example, to detect a stopping vehicle or a fallen object on the road.

Also, image recognition technique is used in a wide field to detect a trouble in electric power facilities, such as a short circuit or a ground fault, a fire in a refuse incineration equipment, etc.

Meanwhile, algorithms for image recognition include, for example, background differentiation whereby an object is detected based on a difference between a background image stored beforehand and each of images input at regular intervals of time, and feature extraction whereby an object is detected by extracting feature items from images, among a diversity of other algorithms.

According to image recognition techniques in general, where the algorithms are large in content, a single image processor is unable to execute the required process, and therefore, frames are thinned out and then subjected to pipeline control to thereby increase the processing speed.

Also, to increase the processing speed, the processor performs concurrent parallel processing for the input/output of image data and for image recognition. According to image processing algorithms, moreover, an image is divided into a plurality of parts which are then usually subjected to distributed processing.

In the conventional pipeline control as described above, however, a plurality of processors successively provide their results of processing with respective time lags before unprocessed data is finally converted to processed data, thus entailing a delay time.

Such a delay time increases in proportion to the number of connection stages of processors and thus poses a problem in cases where a rapid event is to be detected based on an image moving at high speed.

For example, in the case of driverless automatic drive which is under development according to ITS, a fallen object or an abnormal situation must be detected immediately after the occurrence of such an event, in order to prevent an accident. Thus, in image recognition applied to automobiles, high-speed detection is essential.

Also, in the conventional parallel processing for image data, a single bus system is employed and the data input/output process and the image recognition process are carried out through the single bus. Consequently, conflict frequently occurs on the bus, giving rise to a problem that the quality and reliability of the system lower.

Further, in the conventional algorithm distributed processing, a serial communication port with low data transfer capacity is used for synthesizing images after the distributed processing, and accordingly, the synthesis cannot be performed on a real-time basis ($1/30$ second), thus impeding high-speed detection.

SUMMARY OF THE INVENTION

An object of the present invention is to provide an image processing device which is improved in the image processing speed and capable of detecting an object at high speed.

To achieve the above object, there is provided an image processing device for processing an image signal in real time. The image processing device comprises line interval expanding means for expanding an interval between lines of the image signal by an amount corresponding to a number of frames which have been thinned out for real-time processing during frame processing of the image signal, and a plurality of image processing means for performing line processing of the lines of which the interval has been expanded, according to pipeline control.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
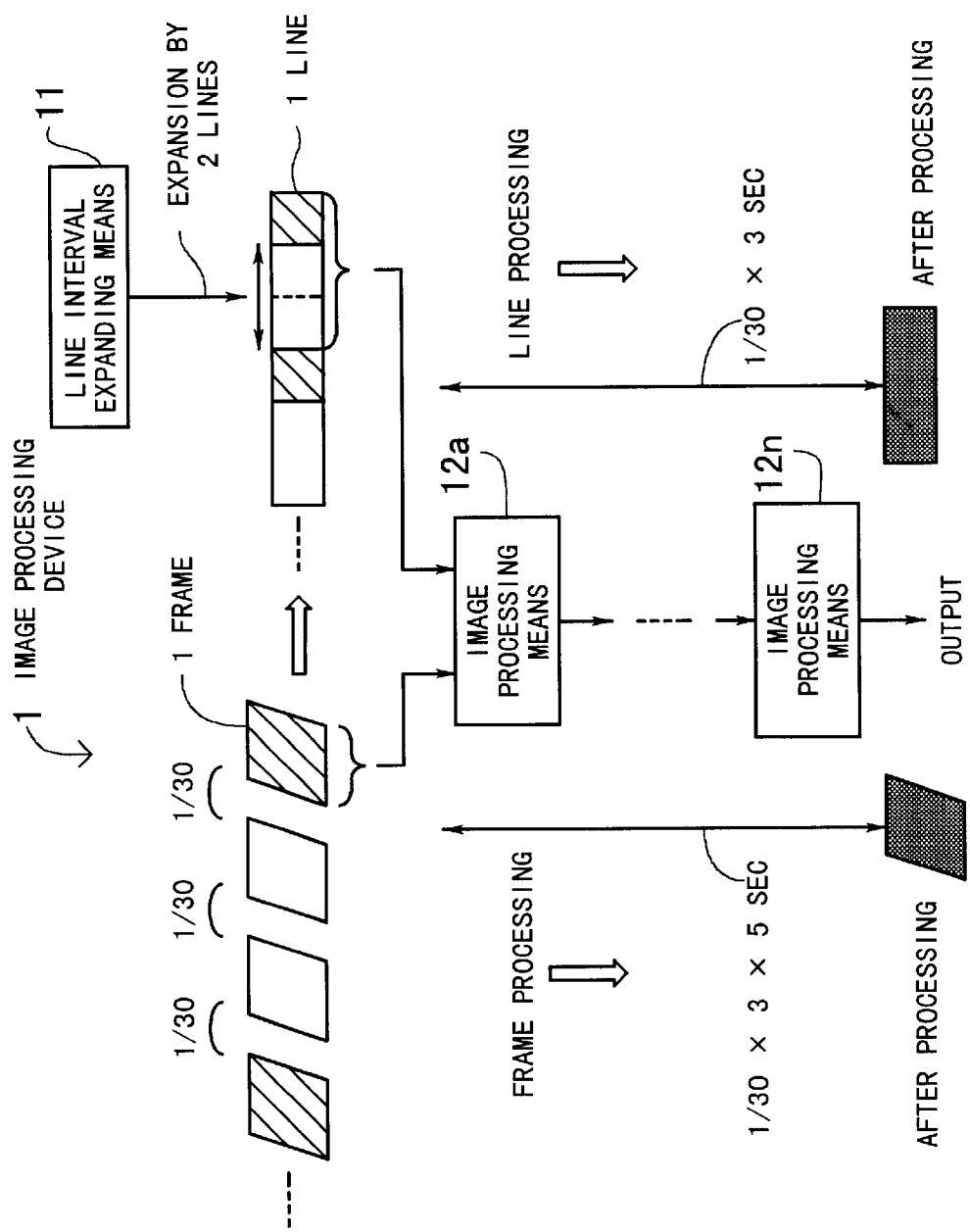
FIG. 1 is a diagram illustrating the principle of an image processing device according to a first embodiment.

Embodiments of the present invention will be hereinafter described with reference to the drawings. FIG. 1 illustrates the principle of an image processing device according to a first embodiment. An image processing device 1 processes an image signal on a real-time basis (1/30 second) to detect an object and perform image recognition.

In cases where frames are thinned out for real-time processing during frame processing of the image signal, line interval expanding means 11 expands the interval between lines of the image signal by an amount corresponding to the number of the frames thinned out.

In FIG. 1, for example, two frames are thinned out during the frame processing, and in this case, the line interval is expanded such that adjacent lines are separated from each other by an amount corresponding to two lines.

Image processing means 12a to 12n perform line processing of the lines whose intervals have been expanded, according to pipeline control.

The frame processing, the line processing and the thinning have the meanings stated below. The frame processing is performed on the entirety of an image corresponding to one frame (one screen) as a target, and can be used for image processing involving complex features and for detection in a situation where the environment changes.

Algorithms adopted in the image processing means for performing the frame processing include feature extraction, labeling, etc.

The line processing is basically performed on an image signal corresponding to one horizontal line (640 pixels) in an image, and pixels to be processed may be in units of one pixel, several marginal pixels, one line, or several lines nearby.

Even with such small unit processing, satisfactory detection can be achieved by the line processing if a simple image is to be processed in a situation where the environmental conditions do not change much.

Algorithms adopted in the image processing means for performing the line processing include masking, background differentiation, projection, binarization, etc.

With the thinning, the image signal input at intervals of 1/30 second from a CCD camera or the like is thinned out in units of one frame. Owing to the thinning, the amount of information is correspondingly reduced, but no problem arises from the thinning in cases where a low-speed time-varying image with a high S/N ratio is to be processed or where a relatively long time may be allowed for the detection.

The operation will be now described. If each of the image processing means 12a to 12n requires 1/30×3 seconds for the frame processing, then it is necessary that the image signal from which two frames have been thinned out should be input in order to perform the frame processing in real time.

Thus, when the frame processing is performed by the image processing means 12a to 12n according to pipeline control, a processing time of 1/30×3×n (n: the number of the image processing means 12a–12n) seconds is required by the time the processing of one frame is completed, entailing a delay.

According to the present invention, by contrast, the line interval expanding means 11 expands the line intervals of a frame (in the illustrated example, by two lines). The lines of which the intervals have thus been expanded are input to the image processing means 12a to 12n and are subjected to line-by-line pipeline control. Consequently, the line-by-line processing can be completed within 1/30×3 seconds before one line is processed.

Thus, for a simple image or the like with no great changes in environmental conditions, an object can be detected satisfactorily by the line processing, and not by the frame processing; therefore, by expanding the line intervals and then subjecting the lines to the line processing according to pipeline control, it is possible to greatly reduce the processing time, permitting high-speed detection of an object.

Figure 2:
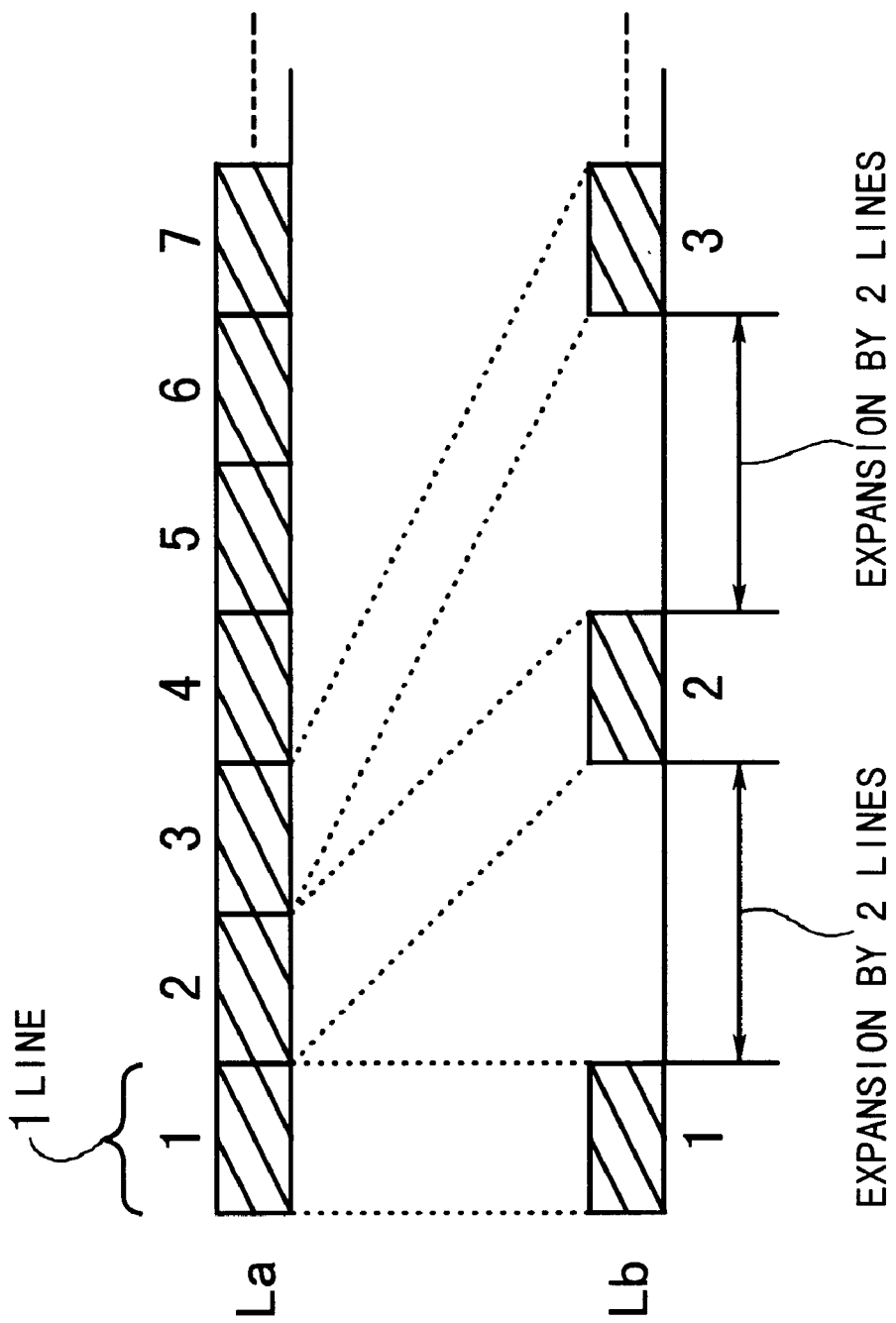
FIG. 2 is a diagram showing a time sequence of a line interval-expanded waveform.

A time sequence of a waveform in which the line intervals have been expanded by the line interval expanding means 11 will be now described. FIG. 2 shows a time sequence of such a line interval-expanded waveform.

A waveform La is a waveform with an ordinary line arrangement, and a waveform Lb is a line waveform of which the line intervals are expanded each by an amount corresponding to two lines.

Figure 3:
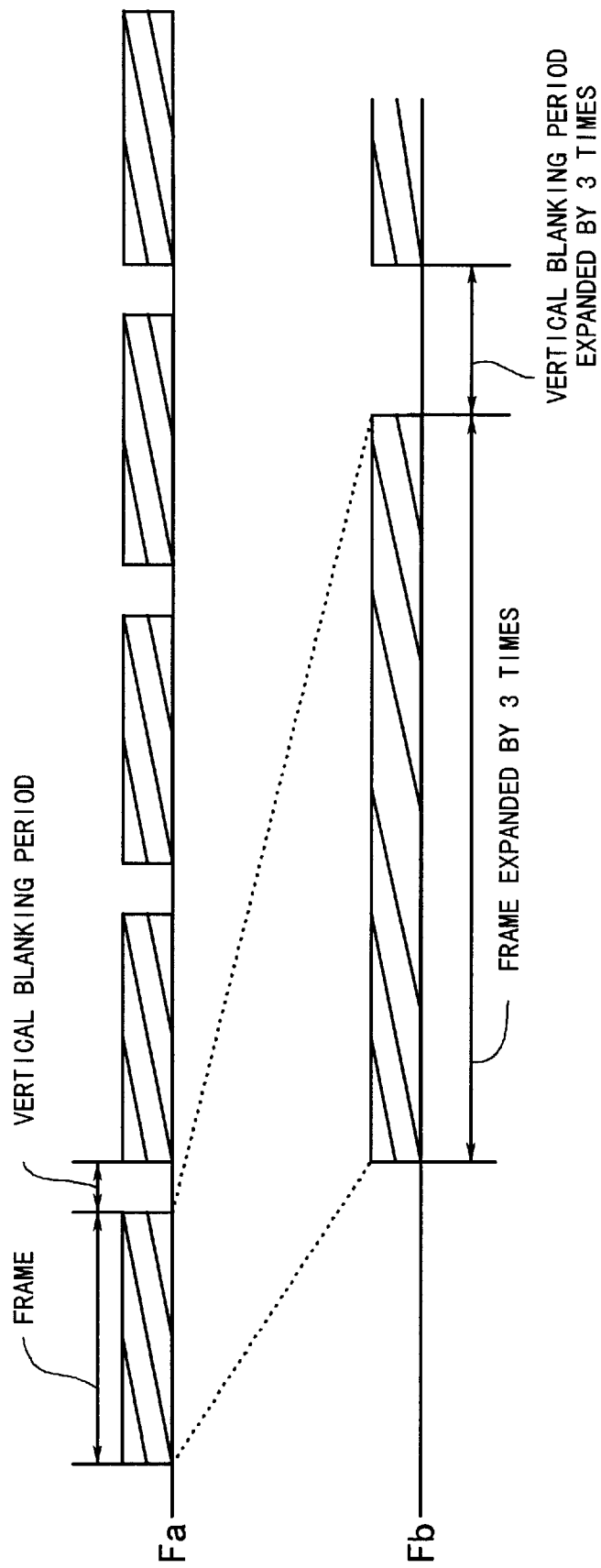
FIG. 3 is a diagram showing a time sequence of a frame waveform in which the line intervals are expanded.

FIG. 3 shows a time sequence of a frame waveform in which the line intervals have been expanded.

A waveform Fa is a waveform with an ordinary frame arrangement. A waveform Fb is a frame waveform of which the line intervals are expanded each by an amount corresponding to two lines, and the expanded frame is three times as long as the original frame. In this case, the vertical blanking period is also expanded by three times.

Figure 4:
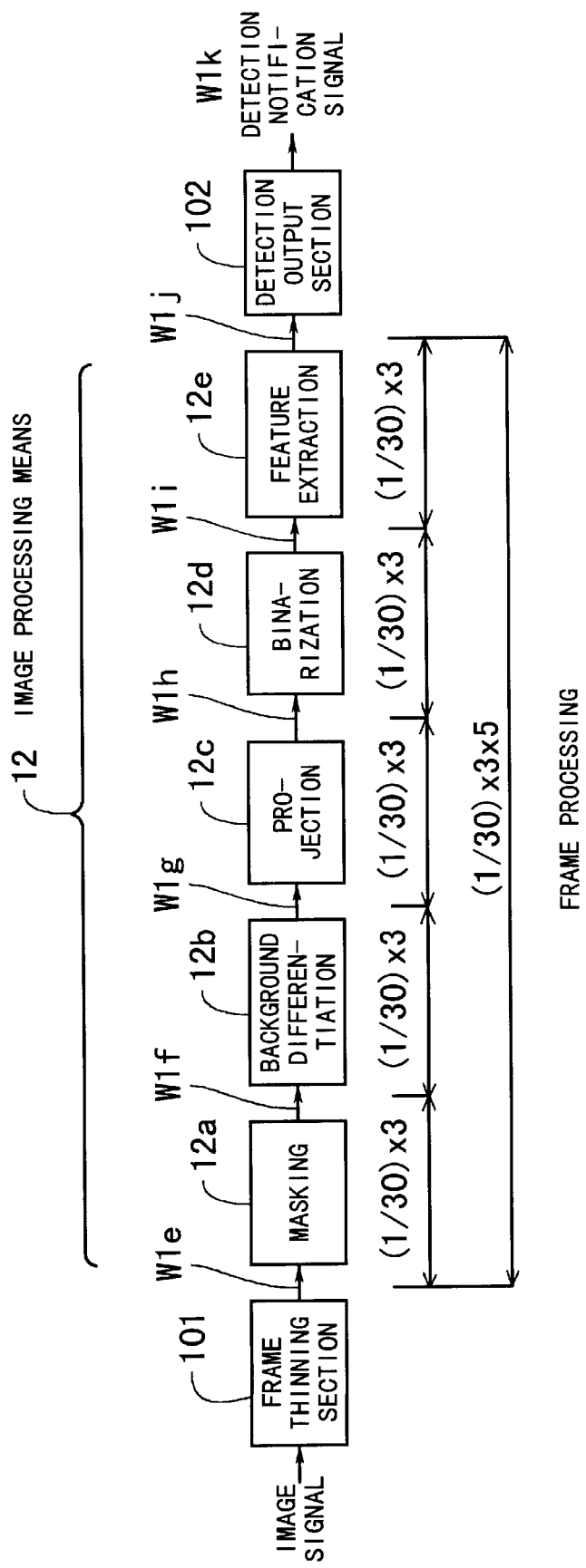
FIG. 4 is a diagram showing a configuration for image processing for performing frame processing.
Figure 5:
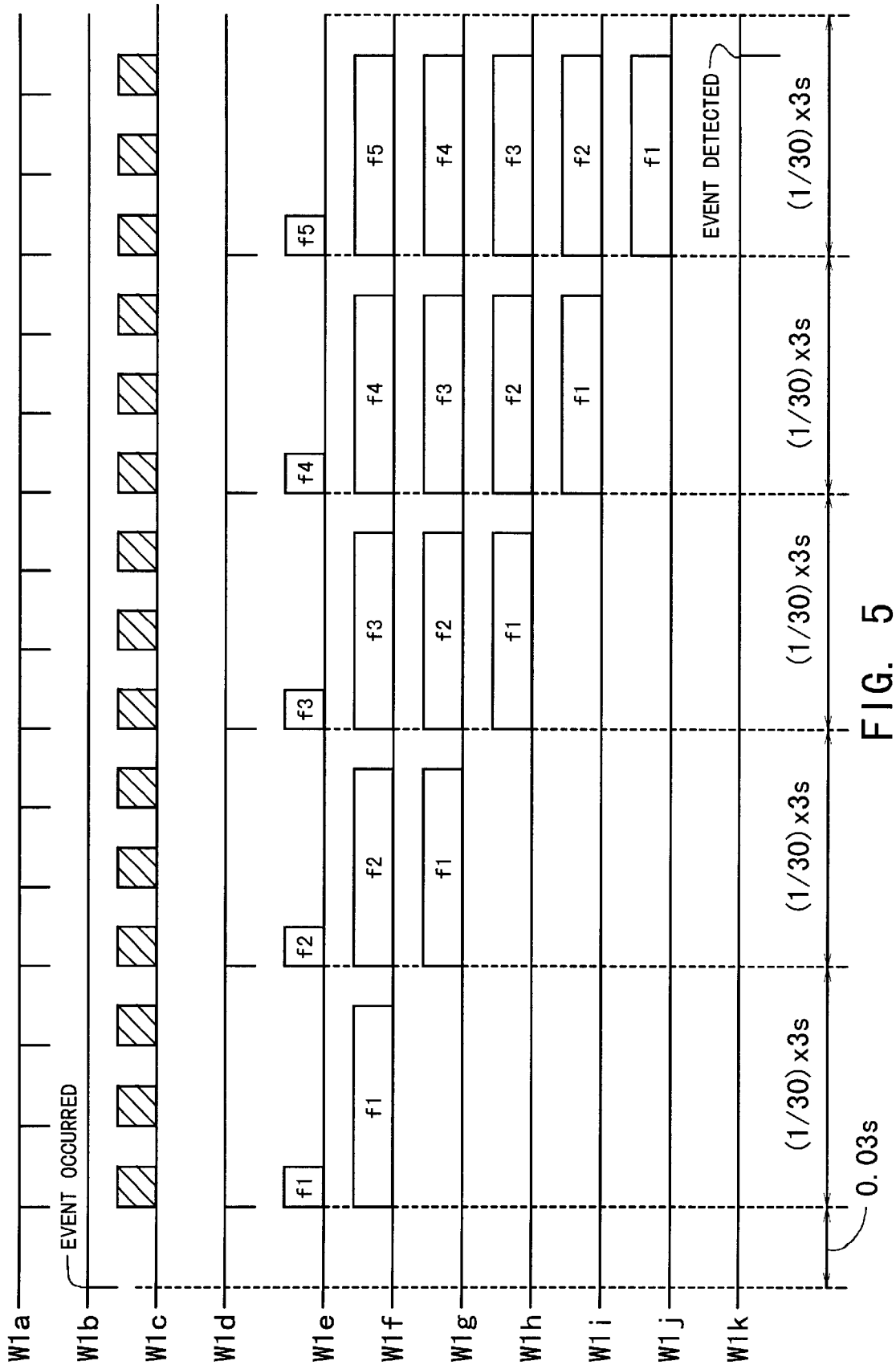
FIG. 5 is a diagram showing a time sequence of waveforms appearing in the configuration shown in FIG. 4.

Referring now to FIGS. 4 and 5, conventional image processing in which frame processing is performed according to pipeline control after frames are thinned out will be explained. FIG. 4 shows a configuration for image processing for performing the frame processing, and FIG. 5 shows a time sequence of waveforms appearing in FIG. 4.

In FIG. 4, an input image signal is subjected to frame thinning at a frame thinning section 101. Image processing is then performed by image processing means 12a to 12e, and if an object is detected, a detection output section 102 outputs a detection notification signal W1k notifying the detection of an object.

As the image processing, the image processing means 12a to 12e execute masking, background differentiation, projection, binarization and feature extraction, respectively, to there by perform image recognition. The frame processing time of each of the image processing means 12a to 12e is 1/30×3 seconds.

In FIG. 5, a waveform W1a denotes a vertical synchronizing signal. A waveform W1b represents an event occurrence signal, and it is assumed that an event occurred at the point of time shown in FIG. 5 (the interval between the occurrence of the event and the next frame is 0.03 second). A waveform W1c represents frames, a waveform W1d represents the vertical synchronizing signal after the thinning, and a waveform W1e represents frames f1 to f5 after the thinning.

These frames f1 to f5 are successively subjected to image processing by the image processing means 12a to 12e according to pipeline control.

Waveforms W1f to W1j represent output signals of the image processing means 12a to 12e, respectively. Where frames are subjected to multistage pipeline processing as shown in FIG. 5, a delay time of (1/30)×3×5+0.03≈530 ms elapses before the detection notification signal W1k is output.

Figure 6:
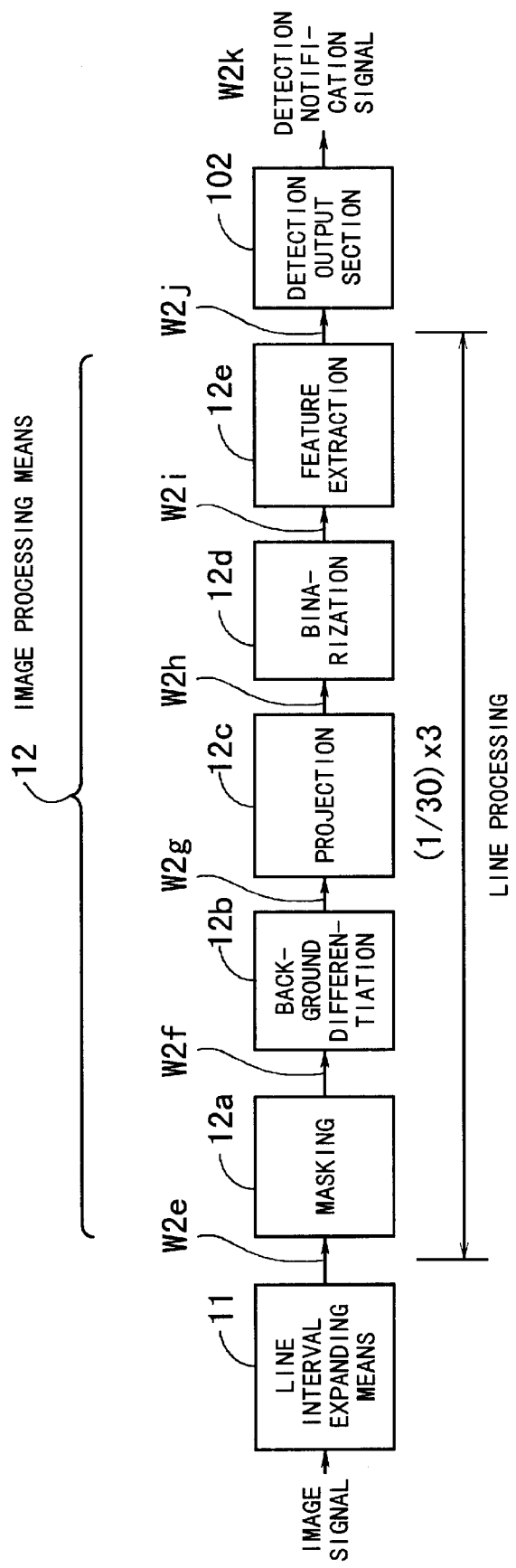
FIG. 6 is a diagram showing a configuration for image processing for performing line processing.
Figure 7:
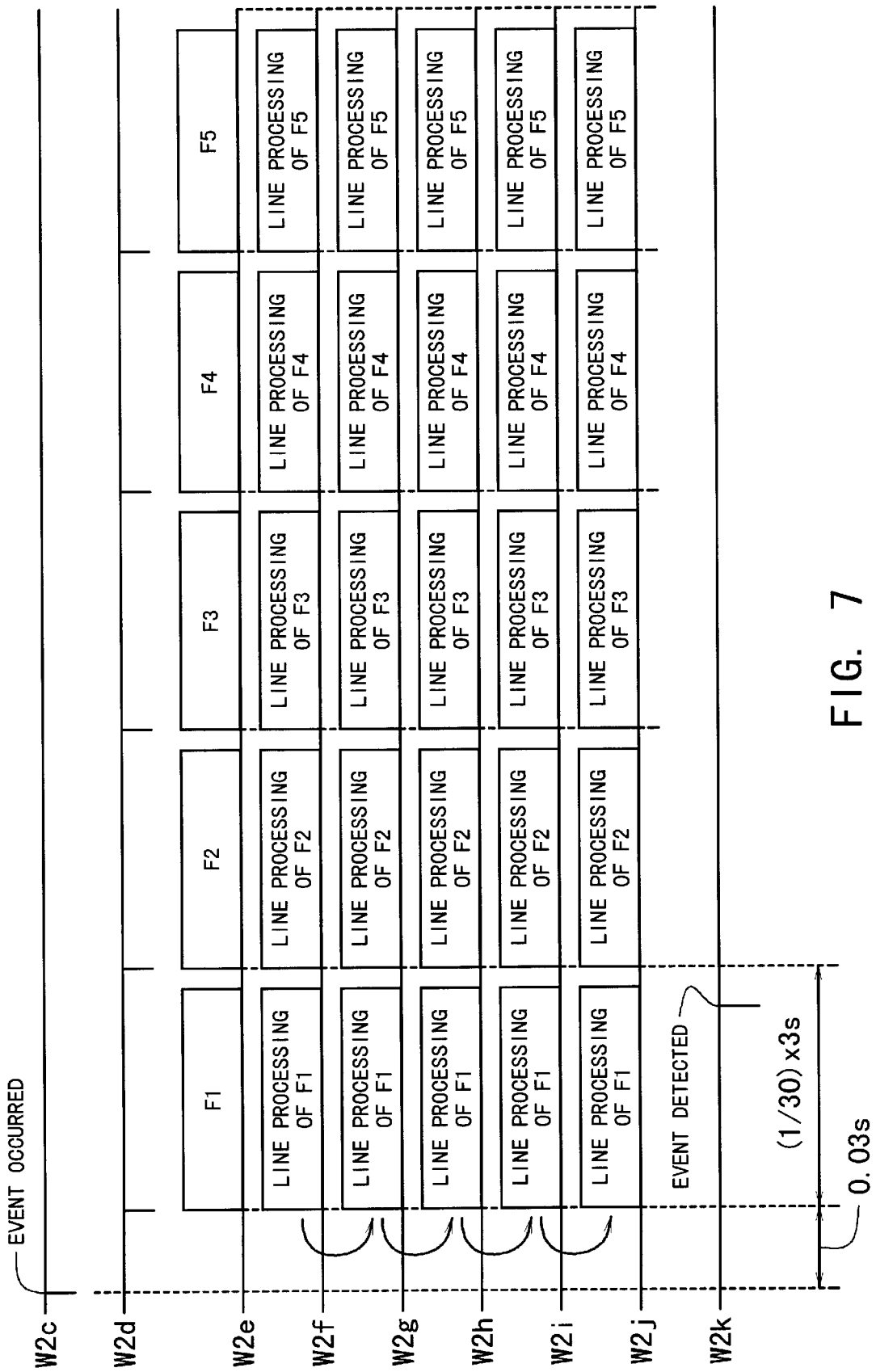
FIG. 7 is a diagram showing a time sequence of waveforms appearing in the configuration shown in FIG. 6.

Referring now to FIGS. 6 and 7, the image processing according to the present invention in which the line processing is performed in accordance with pipeline control after the expansion of line intervals will be described. FIG. 6 shows a configuration for image processing for performing the line processing, and FIG. 7 shows a time sequence of waveforms appearing in FIG. 6.

In FIG. 6, an input image signal is subjected to the line interval expansion at the line interval expanding means 11. Image processing is then performed by the image processing means 12a to 12e, and if an object is detected, the detection output section 102 outputs a detection notification signal W2k notifying the detection of an object. The image processing performed in this case is identical with that explained with reference to FIG. 4.

In FIG. 7, a waveform W2c represents an event occurrence signal, and it is assumed that an event occurred at the point of time shown in FIG. 7. A waveform W2d represents the vertical synchronizing signal after the line interval expansion, and a waveform W2e represents frames F1 to F5 of which the line intervals have been expanded.

The expanded lines of these frames F1 to F5 are successively subjected to image processing by the image processing means 12a to 12e according to pipeline control.

Waveforms W2f to W2j represent output signals of the image processing means 12a to 12e, respectively. Where lines are subjected to multistage pipeline processing as shown in FIG. 7, a delay time of (1/30)×3+0.03≈130 ms elapses before the detection notification signal W2k is output.

Thus, by performing the line processing according to pipeline control following the line interval expansion, it is possible to greatly reduce the processing time.

Figure 8:
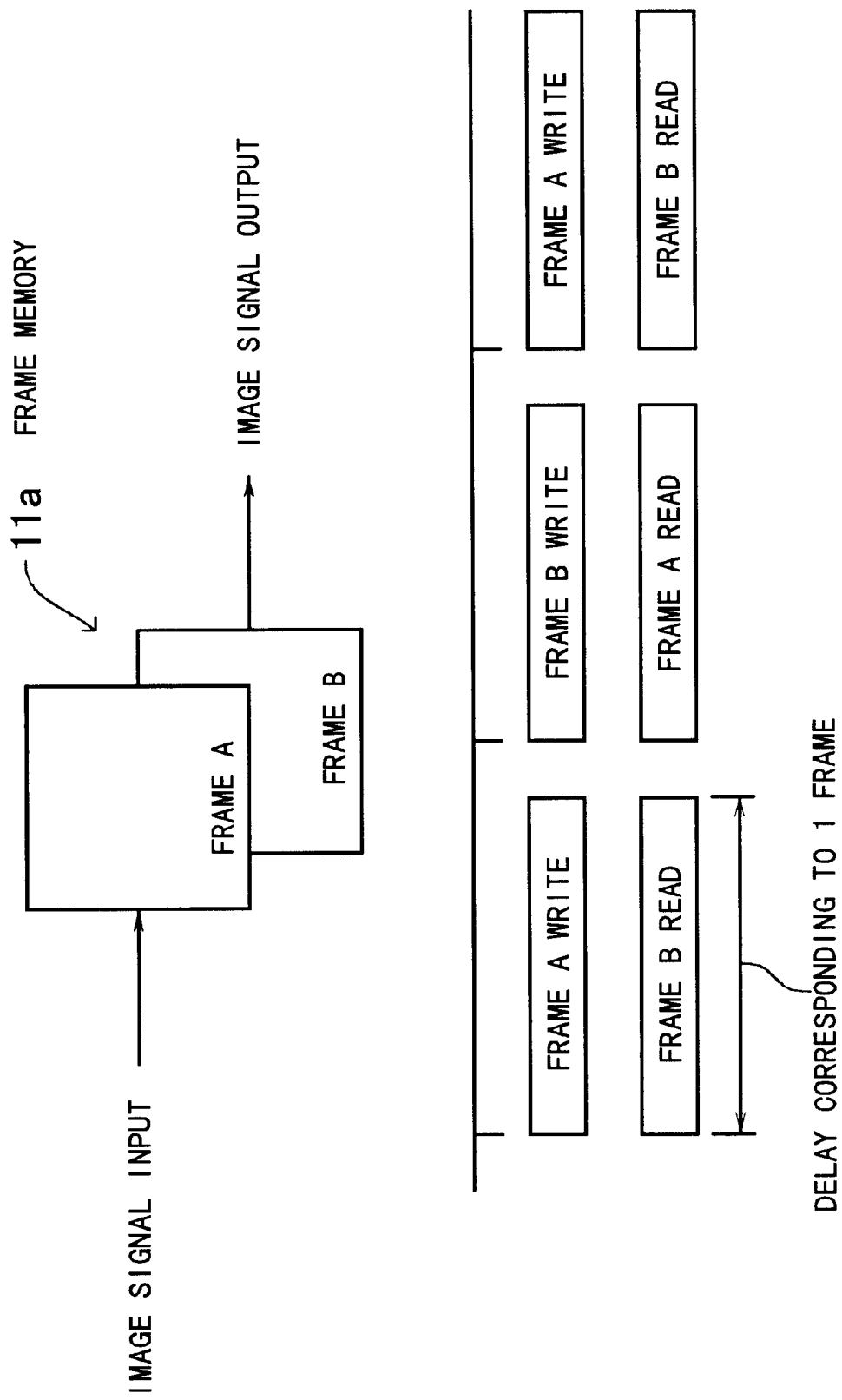
FIG. 8 is a diagram showing a frame memory used in expanding the line intervals.

The following describes a case where the line interval expansion process is performed after the image signal is stored in a frame memory. FIG. 8 shows such a frame memory used in expanding the line intervals.

A frame memory 11a is a double-buffering type memory having sections A and B for alternate reading and writing, and once stores the image signal in units of frames before it outputs the signal while expanding the line intervals.

Consequently, a delay corresponding to one frame occurs between the writing of a frame A and the reading of same, for example, and this delay adds to a delay caused by the line interval expansion.

Where the line interval expansion is performed after frames are once stored in the frame memory 11a, therefore, the delay time equals 1/30 (time corresponding to one frame)+ (1+number of line interval expansions)/30 (seconds).

Figure 9:
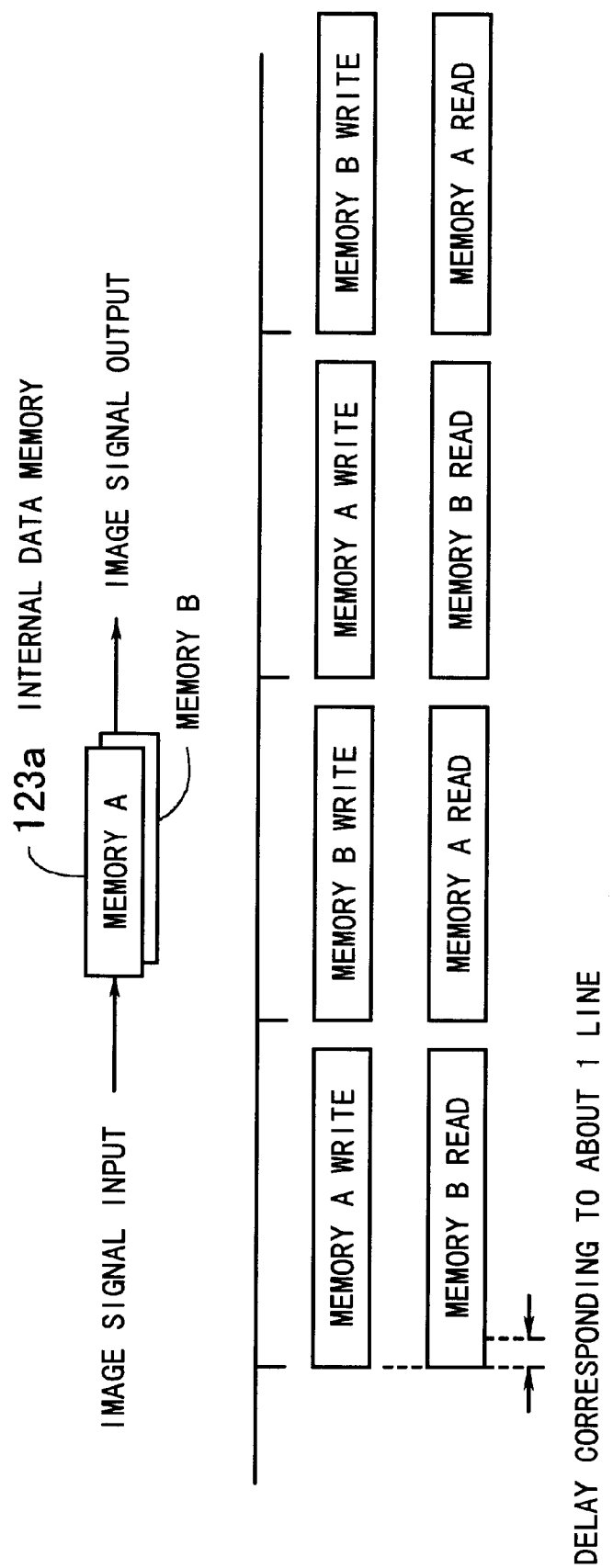
FIG. 9 is a diagram showing an internal data memory used in expanding the line intervals.

The following describes a case where the line interval expansion process is performed after the image signal is stored in a FIFO (First-In, First-Out) corresponding in capacity to one frame. FIG. 9 shows an internal data memory used in expanding the line intervals.

Instead of the frame memory 11a shown in FIG. 8, an internal data memory 123a corresponding in capacity to one frame is provided so as to successively output the image signal with a delay corresponding to the line interval expansion.

Since it is unnecessary to once store frames in the external frame memory, the delay corresponding to one frame is not caused. Accordingly, where the line interval expansion process is performed after the image signal is once stored in the internal data memory 123a, the delay time equals (1+number of line interval expansions)/30 (seconds).

Figure 10:
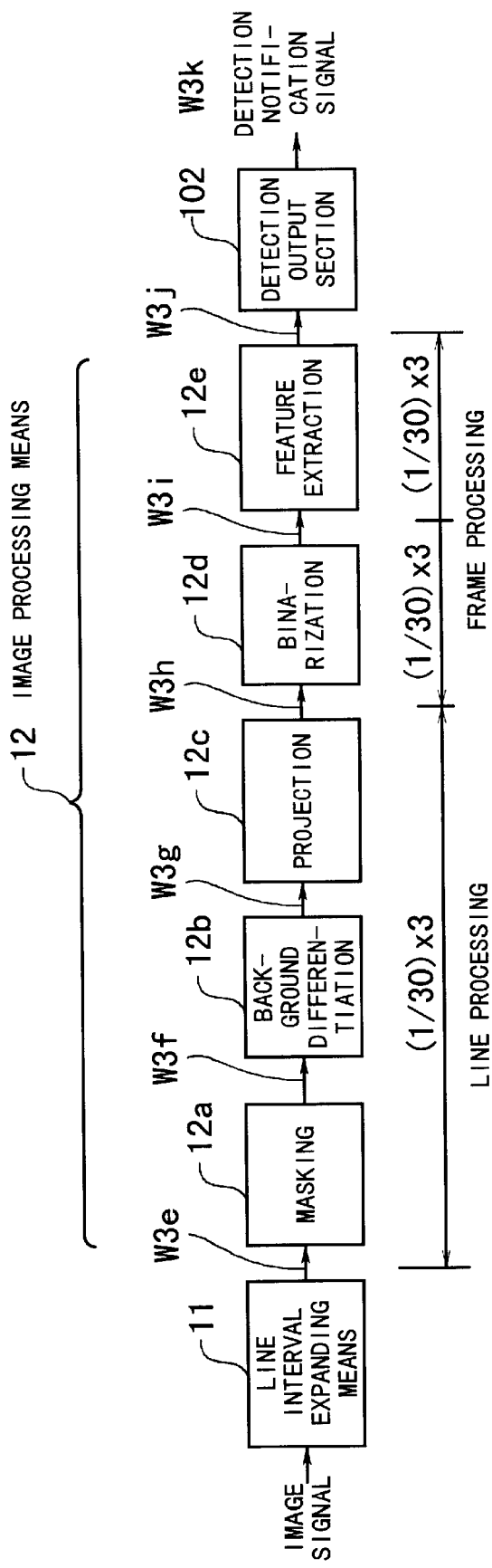
FIG. 10 is a diagram showing a configuration for image processing for performing line processing and frame processing in combination.
Figure 11:
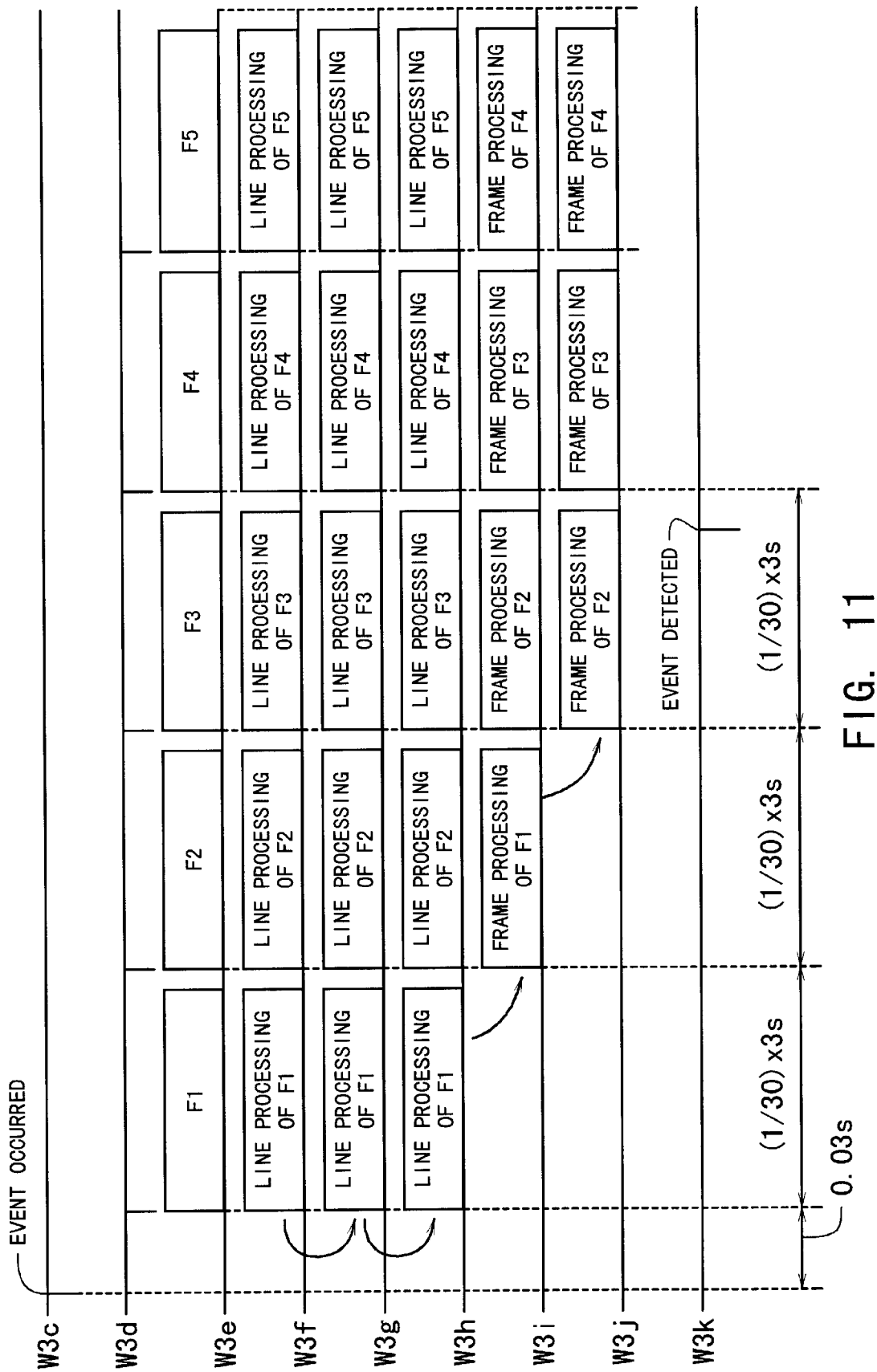
FIG. 11 is a diagram showing a time sequence of waveforms appearing in the configuration shown in FIG. 10.

Referring now to FIGS. 10 and 11, a case where the line processing and the frame processing are combined will be described. FIG. 10 shows a configuration for image processing for performing the line processing and the frame processing in combination, and FIG. 11 shows a time sequence of waveforms appearing in FIG. 10.

In FIG. 10, an input image signal is subjected to the line interval expansion at the line interval expanding means 11. Image processing is then performed by the image processing means 12a to 12e, and if an object is detected, the detection output section 102 outputs a detection notification signal W3k notifying the detection of an object.

In the image processing, masking, background differentiation and projection respectively performed by the image processing means 12a to 12c are the line processing, and binarization and feature extraction respectively performed by the image processing means 12d and 12e are the frame processing.

In FIG. 11, a waveform W3c represents an event occurrence signal, and it is assumed that an event occurred at the point of time shown in the figure. A waveform W3d represents the vertical synchronizing signal after the line interval expansion, and a waveform W3e represents frames F1 to F5 of which the line intervals have been expanded.

The expanded lines of these frames F1 to F5 are successively subjected to image processing by the image processing means 12a to 12e according to pipeline control. Waveforms W3f to W3j represent output signals of the image processing means 12a to 12e, respectively.

The waveforms W3f to W3h are obtained by the line processing, and the waveforms w3i and w3j are obtained by the frame processing.

Where multistage pipeline processing is performed as shown in FIG. 11, therefore, a delay time of (1/30)×3×3+ 0.03≈330 ms elapses before the detection notification signal W3k is output.

Thus, by combining algorithms suited for the line processing, such as masking, background differentiation, etc., and algorithms suited for the frame processing, such as feature extraction etc., it is possible to process images efficiently.

As described above, the image processing device 1 according to the first embodiment is constructed such that the line intervals of an image signal are expanded and then the line processing is performed according to pipeline control. This permits the image processing speed to be increased and the presence of an object to be detected at high speed.

Figure 12:
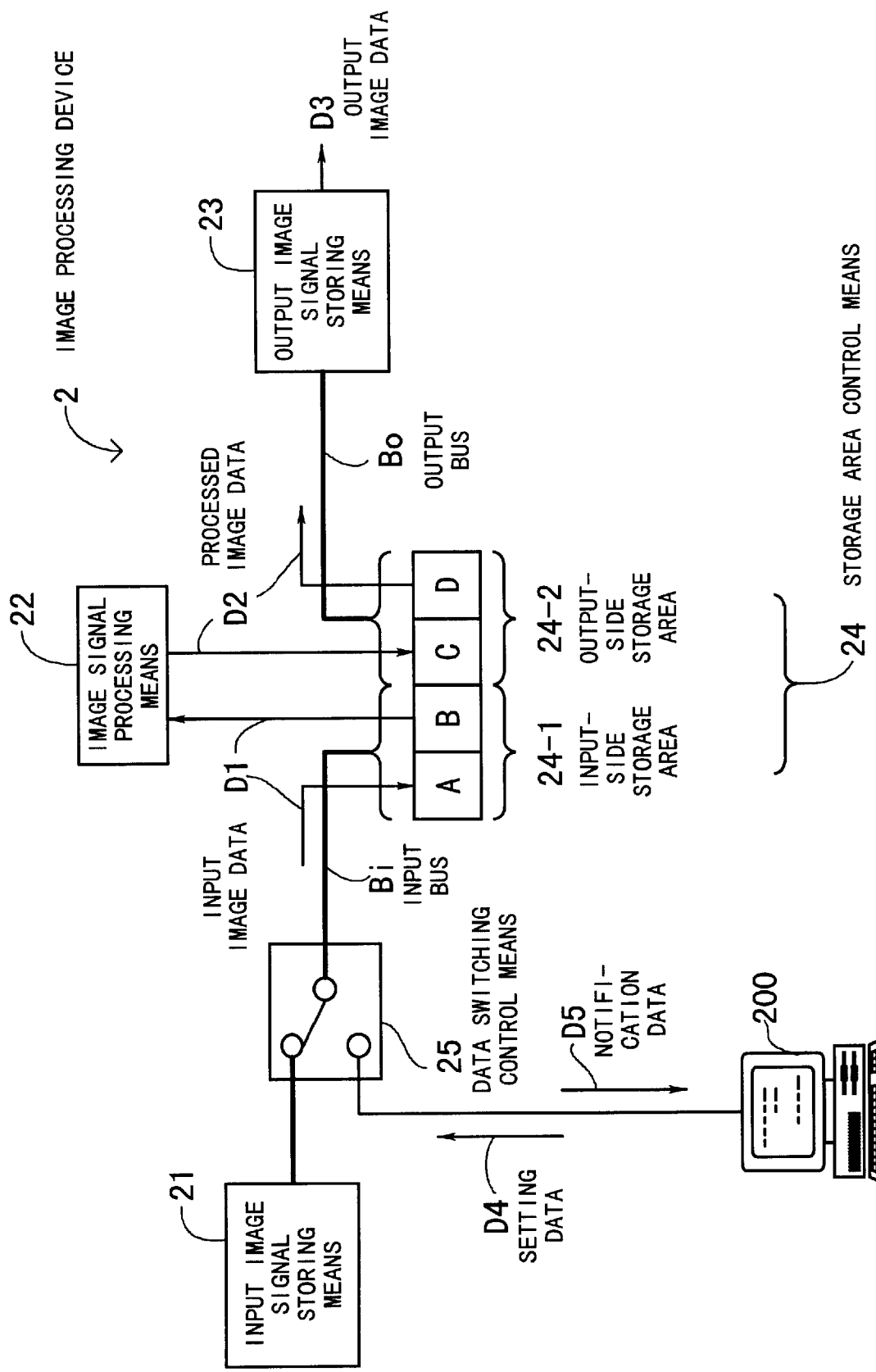
FIG. 12 is a diagram illustrating the principle of an image processing device according to a second embodiment.

An image processing device according to a second embodiment will be now described. FIG. 12 illustrates the principle of the image processing device according to the second embodiment. An image processing device 2, which is constituted by the elements shown in the figure except a host 200, performs an image input process, image processing and an image output process by concurrent parallel processing.

Input image signal storing means 21 stores an input image signal and outputs the signal as input image data D1.

Image signal processing means 22 processes the input image data D1 and generates processed image data D2.

Output image signal storing means 23 stores the processed image data D2 and outputs the stored data to the outside as output image data D3.

Storage area control means 24 has an input-side storage area 24-1 and an output-side storage area 24-2. The input-side storage area 24-1 is connected to the input image signal storing means 21 via an input bus Bi and comprises a double-buffering type memory which operates in a manner such that, when one memory section thereof stores input image data D1, the other outputs the input image data D1 stored therein to the image signal processing means 22. The input-side storage area 24-1 also controls the storage of setting data D4 and notification data D5, described later.

In FIG. 12, the memory section A is storing input image data D1 while the memory section B is outputting the input image data D1 already stored therein. After switching, the processes of the memory sections are reversed.

The output-side storage area 24-2 is connected to the output image signal storing means 23 via an output bus Bo and comprises a double-buffering type memory which operates in a manner such that, when one memory section thereof stores processed image data D2, the other outputs the processed image data D2 stored therein to the output image signal storing means 23.

In FIG. 12, the memory section C is storing processed image data D2 while the memory section D is outputting the processed image data D2 already stored therein. After switching, the processes of the memory sections are reversed.

Data switching control means 25 controls the switching between the input image data D1 and the setting data D4 from the host 200 such as a workstation, both sent to the image signal processing means 22, and also controls the transmission of the notification data D5 from the image signal processing means 22 to the host 200.

The setting data D4 is, for example, a program, mask data, etc., and the notification data D5 is detection result notification data indicative of detection of an object by the image signal processing means 22, etc.

Figure 13:
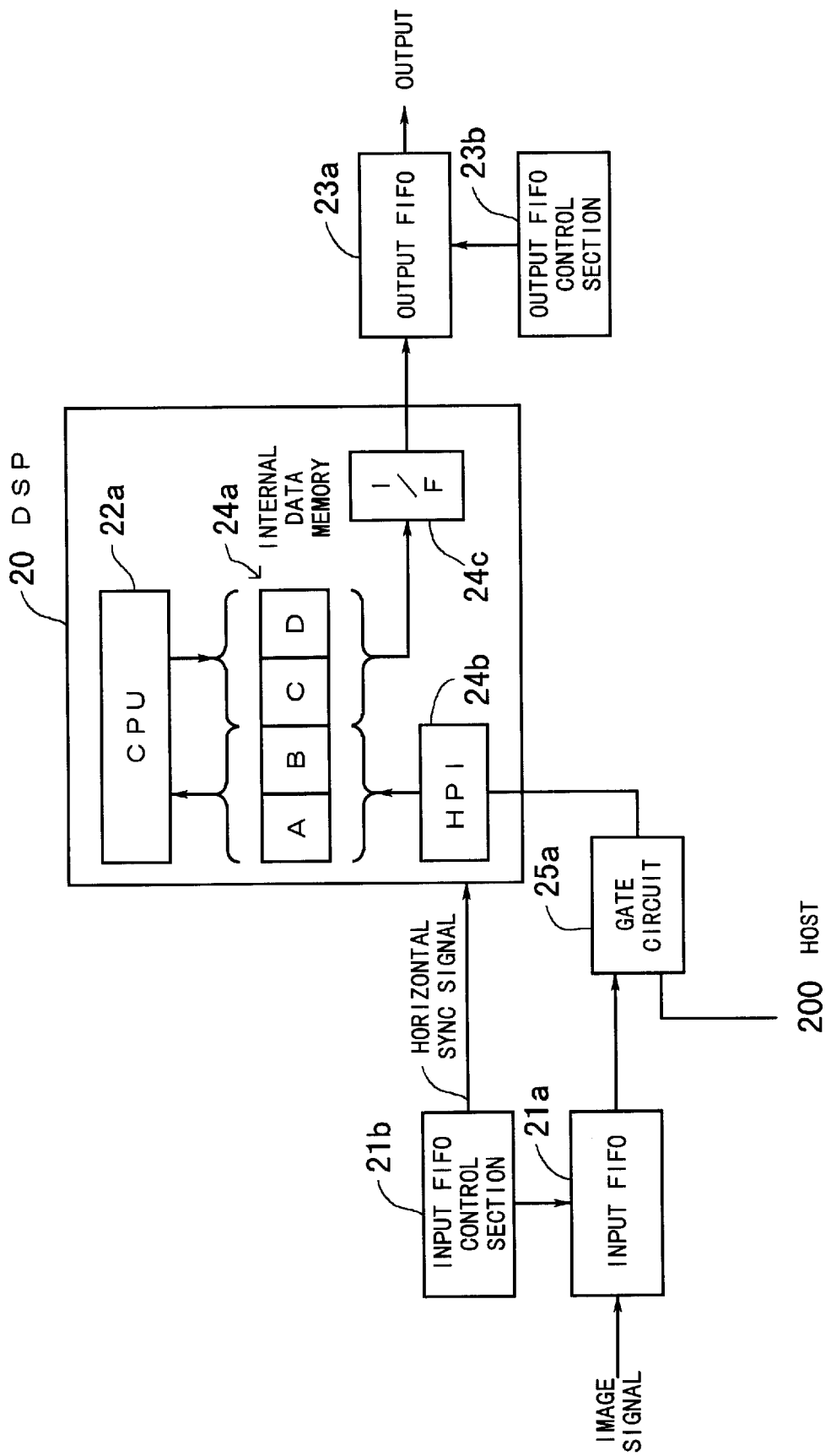
FIG. 13 is a diagram showing the configuration of the image processing device.

Specific arrangement and operation of the image processing device 2 will be now described. FIG. 13 shows the arrangement of the image processing device 2. The image signal processing means 22 and the storage area control means 24 are incorporated in a single DSP (Digital Signal Processor) 20.

A CPU 22a corresponds to the image signal processing means 22, and an internal data memory 24a, an HPI (Host Port Interface) 24b and an I/F 24c correspond to the storage area control means 24.

An input FIFO 21a and an input FIFO control section 21b correspond to the input image signal storing means 21, and an output FIFO 23a and an output FIFO control section 23b correspond to the output image signal storing means 23. The data switching control means 25 is constituted by a gate circuit 25a.

The internal data memory 24a of the DSP 20 has an arrangement of multiple banks (memory sections A to D) which are accessible independently of one another.

In the illustrated example, the memory sections A and B as image input line memories are alternately switched to input/output an image line signal.

Specifically, when the memory section A stores the image line signal input thereto via the HPI 24b, the memory section B outputs the image line signal stored therein to the CPU 22a, which then performs image processing. Such operations are alternately performed by the memory sections A and B, whereby the input of the image line signal and the image processing can be executed in parallel with each other.

In the memory sections C and D, while the memory section C stores the processed image data input thereto, the memory section D outputs the processed image data stored therein to the output FIFO 23a via the I/F 24c. Such operations are alternately performed by the memory sections C and D.

The input FIFO control section 21b supplies the DSP 20 with a horizontal synchronizing signal as an interrupt signal, which serves as a reference signal in line-by-line operation.

In the above description, the memory section pairs A–B and C–D each comprise a double-buffering type memory for storing lines, but a double-buffering type memory for storing frames may alternatively be used to perform the frame processing.

The flow of the image signal will be now explained. The image signal is sent from the input FIFO 21a to the gate circuit 25a, and then to the internal data memory A/B via the HPI 24b, both provided within the DSP 20.

The output image signal is sent from the internal data memory C/D within the DSP 20 to the output FIFO 23a.

The image signal processing is carried out by the CPU 22a within the DSP 20; namely, the CPU 22a reads out the image signal from one of the internal data memory sections A and B (the CPU accesses the other memory section than that to which the image signal is being input) for image signal processing, and stores the result of processing in one of the internal data memory sections C and D (the CPU accesses, as in the case of data read, the other memory section than that from which the result of processing is being output).

The operation will be now described in detail. The input FIFO 21a receives the image signal line by line, that is, the image line signal.

The input FIFO control section 21b sends an interrupt to the DSP 20 at the point of time when the input FIFO 21a has received one line of image signal, and the image signal is then sent to the internal data memory A/B via the HPI 24b under the control of the input FIFO control section 21b.

Whether the image signal is to be transferred to the internal data memory section A or B is specified by a transfer address generated by the input FIFO control section 21b.

During the transfer of input image data to the internal data memory section A, the CPU 22a performs image processing with respect to the internal data memory section B, and at the next line input timing, input image data is transferred to the internal data memory section B and the CPU 22a performs image processing with respect to the internal data memory section A.

The result of image processing is stored in the internal data memory section C or D (the other memory section than that which is outputting the result of image processing is accessed). The output image data D3 is then output from the output FIFO 23a to an image bus with the timing thereof controlled by a pixel clock.

As described above, the image processing device 2 according to the second embodiment is constructed such that the image processing is performed with the use of the storage area control means 24 which is connected to the input bus Bi for controlling the storage of the input image data D1 and which is also connected to the output bus Bo for controlling the storage of the processed image data D2. This permits the input and output buses to be separated from each other, making it possible to eliminate the occurrence of conflicts and to improve the quality and reliability of the device.

Figure 14:
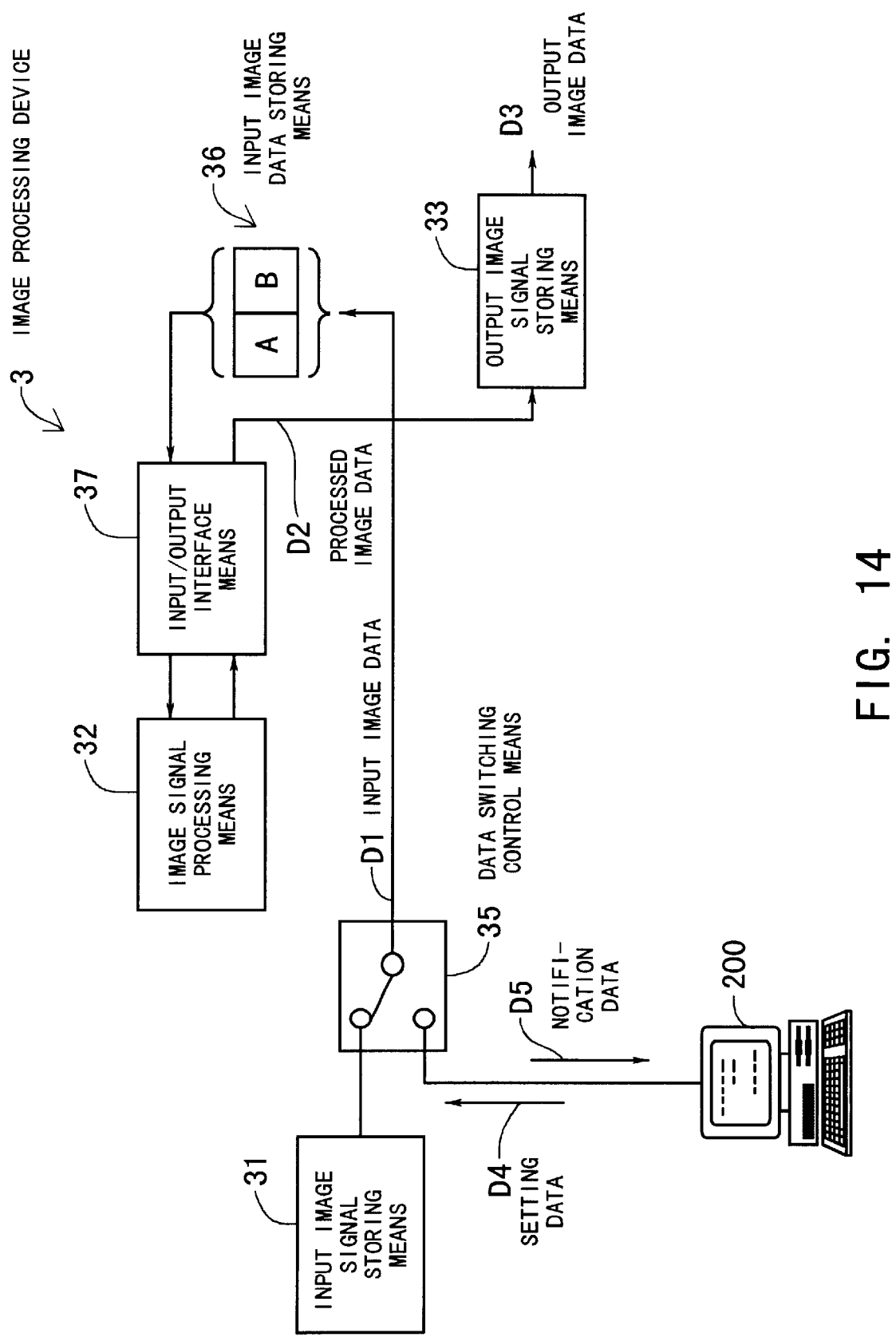
FIG. 14 is a diagram illustrating the principle of an image processing device according to a third embodiment.

An image processing device according to a third embodiment will be now described. FIG. 14 illustrates the principle of the image processing device according to the third embodiment. An image processing device 3, which is constituted by the elements shown in the figure except a host 200, performs an image input process, image processing and an image output process by concurrent parallel processing.

Input image signal storing means 31 stores an input image signal and outputs the signal in a time-divided manner as input image data D1.

Image signal processing means 32 processes the input image data D1 in a time-divided manner, generates and outputs processed image data D2.

Output image signal storing means 33 stores the processed image data D2 and outputs the stored data to the outside as output image data D3.

Input image data storing means 36 has a double-buffering structure whereby, when one memory section thereof is storing input image data D1, the other outputs the input image data D1 already stored therein to the image signal processing means 32.

Input/output interface means 37 serves as an input interface for the input image data D1 input to the image signal processing means 32 from the input image data storing means 36, and also as an output interface for the processed image data D2 output from the image signal processing means 32 to the output image signal storing means 33.

Data switching control means 35 controls the switching between the input image data D1 and setting data D4 from the host 200 such as a workstation, both sent to the image signal processing means 32, and also controls the transmission of notification data D5 from the image signal processing means 32 to the host 200.

Figure 15:
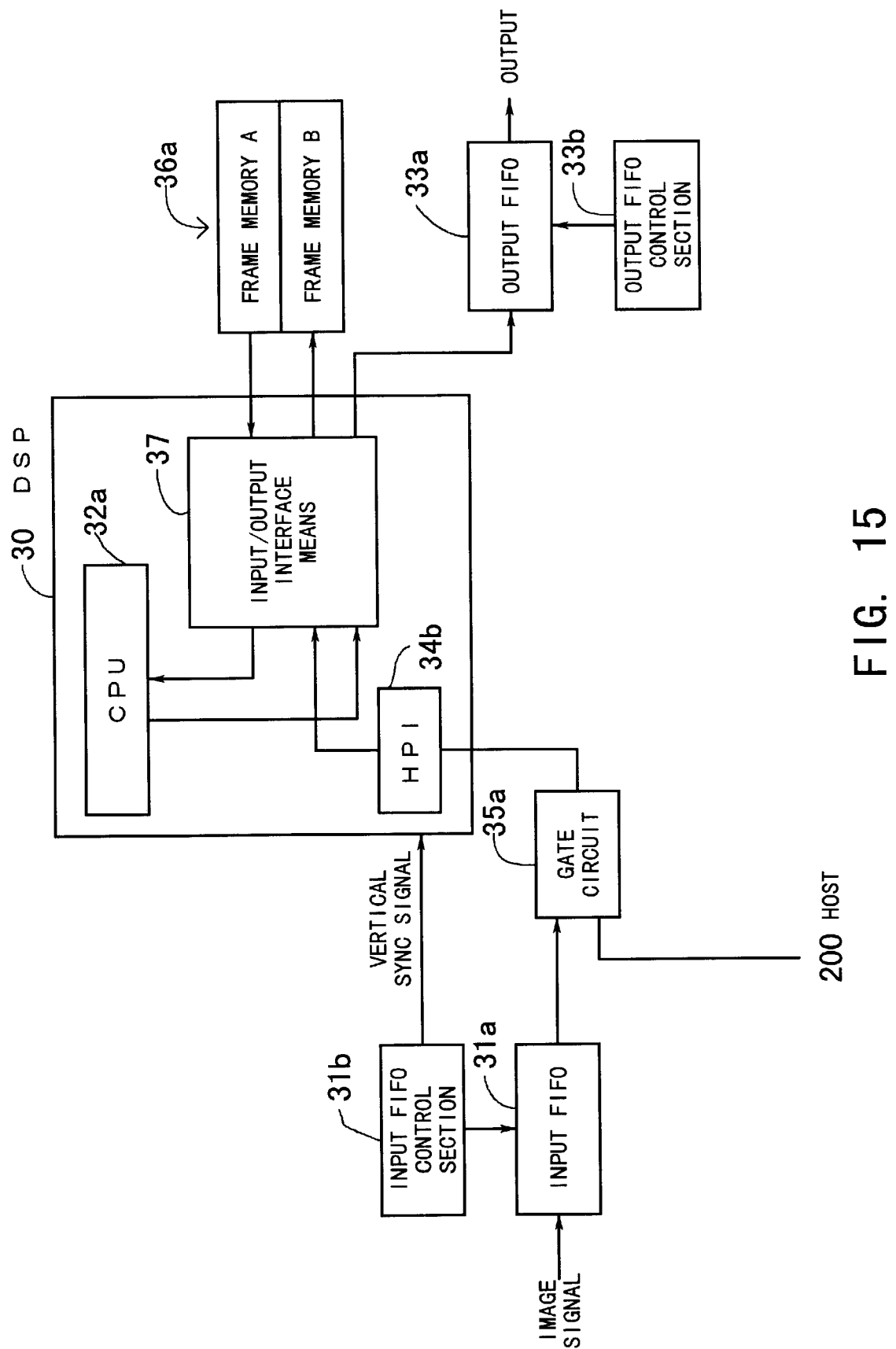
FIG. 15 is a diagram showing the configuration of the image processing device.

Specific arrangement and operation of the image processing device 3 will be now described. FIG. 15 shows the arrangement of the image processing device 3. A DSP 30 includes therein a CPU 32a corresponding to the image signal processing means 32, but does not include the internal data memory 24a described with reference to FIG. 13. Frame memories (A, B) 36a correspond to the input image data storing means 36.

Also, an input FIFO 31a and an input FIFO control section 31b correspond to the input image signal storing means 31, and an output FIFO 33a and an output FIFO control section 33b correspond to the output image signal storing means 33. The data switching control means 35 comprises a gate circuit 35a.

The third embodiment uses, in place of the internal data memory 24a, the frame memories (A, B) 36a capable of frame-by-frame double buffering, and carries out parallel operation frame by frame.

Since, in this case, there is a possibility that conflict may occur in the input/output interface means 37, the transfer rate of image input/output data is increased by twice to three times and the image data is transferred in a time-divided manner, thereby avoiding such conflict.

For example, timings are programmed to achieve an operation such that the transfer of image input is completed within the first 1/3 period of the frame time, that the image processing is performed by the DSP 30 within the next 1/3 period, and that the processed data is output to the output FIFO 33a within the last 1/3 period.

Thus, according to the third embodiment, the DSP 30, which does not have the internal data memory 24a, operates in a time-divided manner, whereby high-speed operation can be achieved without conflicts occurring in the interface section.

Figure 16:
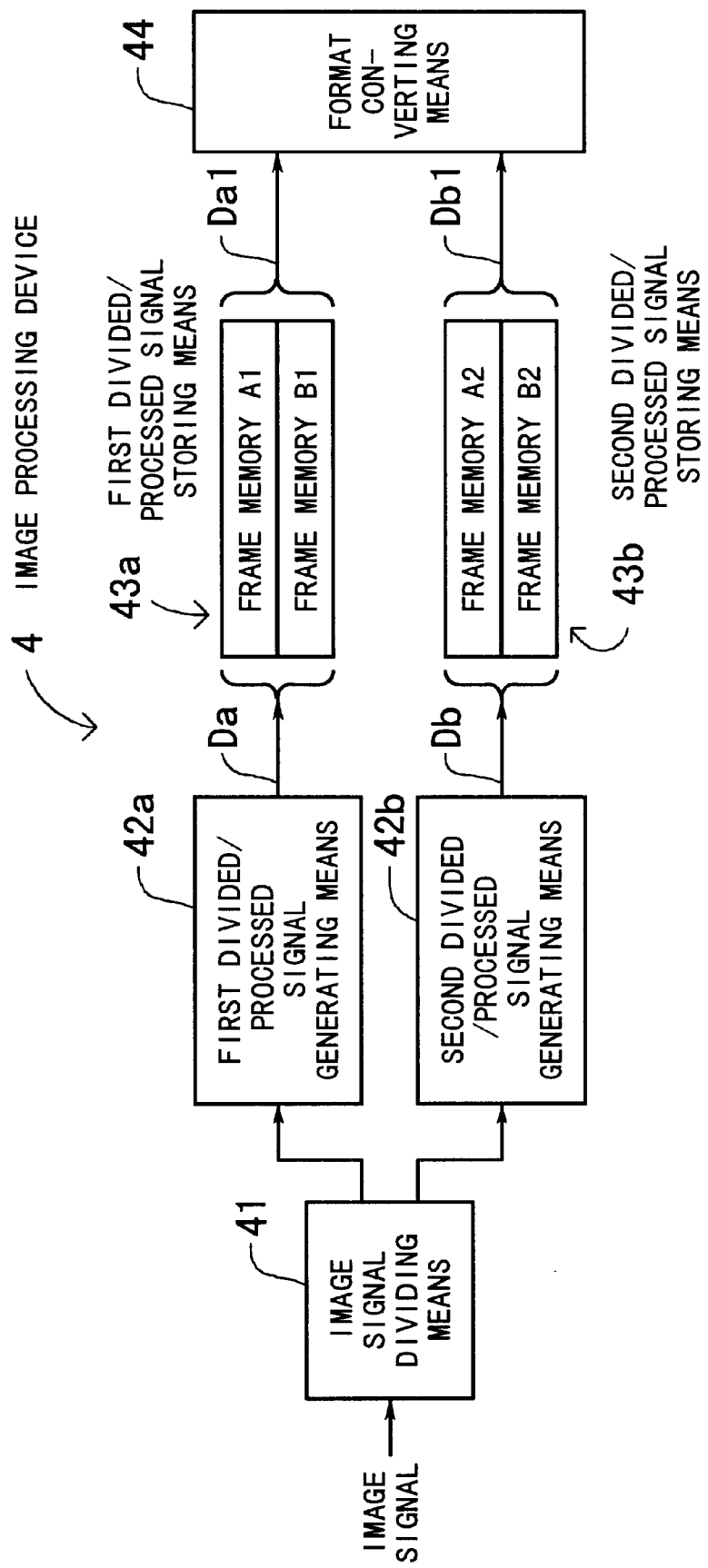
FIG. 16 is a diagram illustrating the principle of an image processing device according to a fourth embodiment.

A fourth embodiment will be now described. FIG. 16 illustrates the principle of an image processing device according to the fourth embodiment. In cases where the image processing speed is not high enough to attain the required performance, an image processing device 4 increases the processing speed by dividing and then synthesizing an image signal.

Image signal dividing means 41 divides an image signal, in the illustrated example, into two series of image signal.

First divided/processed signal generating means 42a processes one of the two divided series of image signal and generates a first divided/processed signal Da.

Second divided/processed signal generating means 42b processes the other of the two divided series of image signal and generates a second divided/processed signal Db.

First divided/processed signal storing means 43a has a double-buffering structure (frame memories A1, B1) whereby, when one frame memory thereof is storing a first divided/processed signal Da, the other frame memory outputs the first divided/processed signal Da already stored therein.

Second divided/processed signal storing means 43b also has a double-buffering structure (frame memories A2, B2) whereby, when one frame memory thereof is storing a second divided/processed signal Db, the other frame memory outputs the second divided/processed signal Db already stored therein.

Format converting means 44 synthesizes signals Da1 and Db1 output from the first and second divided/processed signal storing means 43a and 43b, respectively, by means of hardware, thereby performing format conversion.

Figure 17:
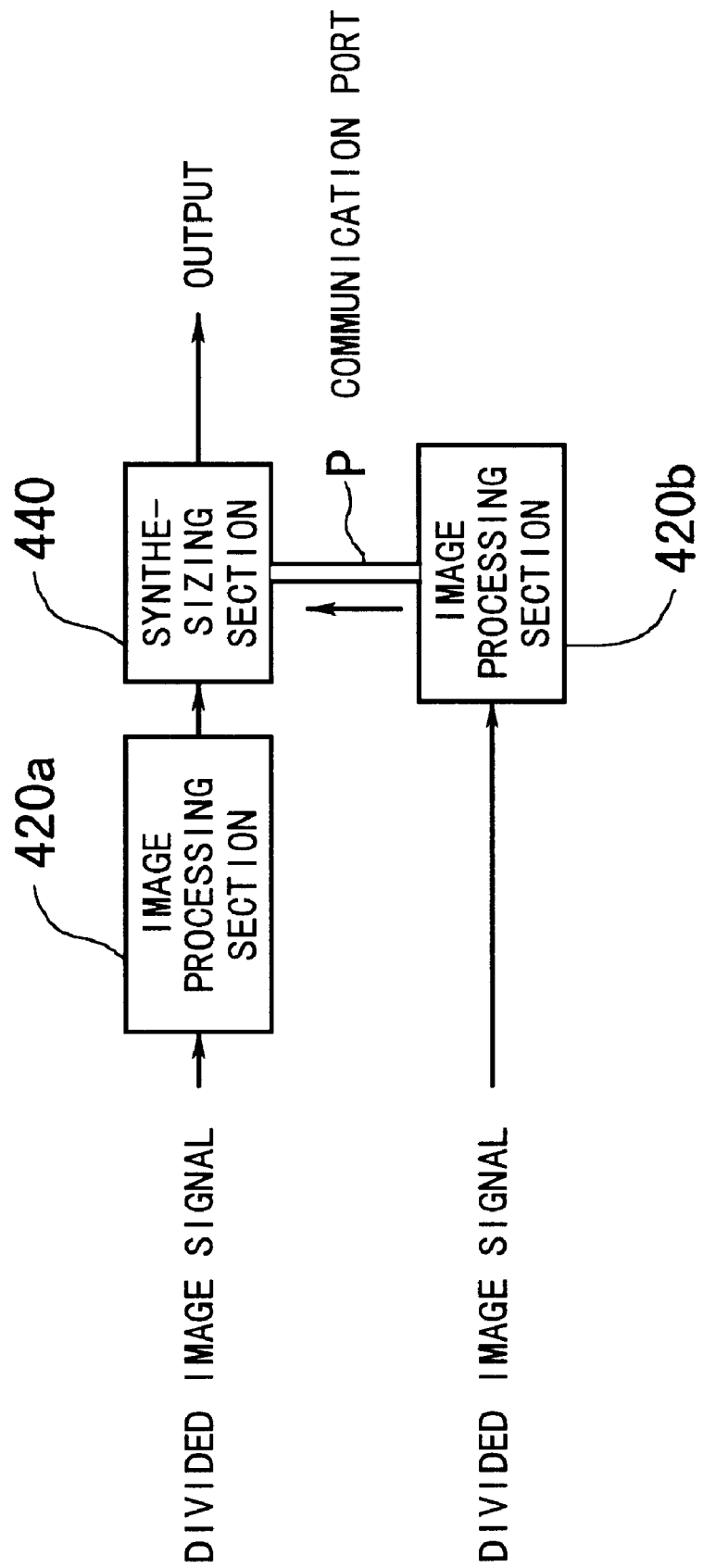
FIG. 17 is a diagram illustrating a conventional image signal division and synthesis process.

Conventional image signal division and synthesis will be now explained. FIG. 17 illustrates a conventional process for dividing and synthesizing an image signal.

Two divided series of image signal are processed by image processing sections 420a and 420b, respectively.

A synthesizing section 440 synthesizes a signal processed by the image processing section 420a and a signal processed by the image processing section 420b and transmitted via a 1-bit serial communication port P.

Thus, the conventional synthesis is carried out using a 1-bit serial communication port P having low data transfer capacity, and therefore, image processing cannot be performed in real time.

The first and second divided/processed signal storing means 43a and 43b and the format converting means 44 according to the present invention will be now described.

As seen from FIG. 16, the first divided/processed signal Da is input and output with the frame memories A1 and B1 alternately switched.

For example, while the frame memory A1 is storing a first divided/processed signal Da input thereto, the frame memory B1 outputs the first divided/processed signal Da already stored therein to the format converting means 44. Such store and output operations are alternately switched between the frame memories A1 and B1.

Similarly, with the frame memories A2 and B2 alternately switched, the second divided/processed signal Db is input and output.

For example, while the frame memory A2 is storing a second divided/processed signal Db input thereto, the frame memory B2 outputs the second divided/processed signal Db already stored therein to the format converting means 44. Such store and output operations are alternately switched between the frame memories A2 and B2.

The format converting means 44 synthesizes the output signals Da1 and Db1 by means of hardware to perform format conversion. This is because, if the DSP chip, which performs the image processing, is used also for the synthesis of the image signal, the load on the DSP chip increases and the processing speed lowers.

Thus, the first and second divided/processed signals Da and Db are stored respectively in the first and second divided/processed signal storing means 43a and 43b each having a double-buffering structure, and the synthesis and format conversion of the output signals Da1 and Db1 from the storing means 43a and 43b are executed by means of hardware. This makes it possible to perform the format conversion at high speed at the time of image synthesis.

Referring now to FIGS. 18 through 21, the format conversion will be described. When synthesizing divided image signals, it is necessary that a format conversion matching the division pattern be executed in order to restore the original image.

Figure 18:
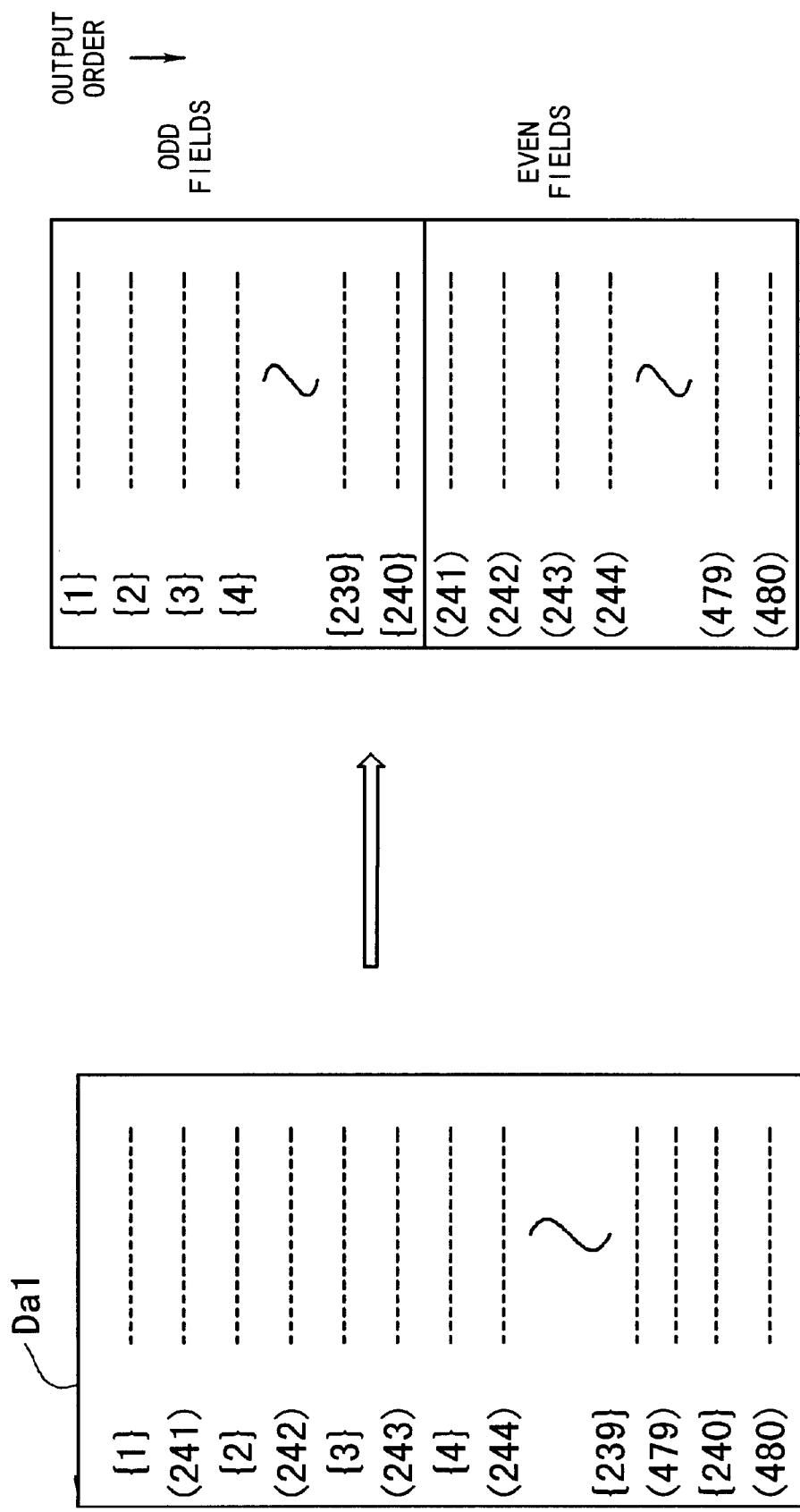
FIG. 18 is a diagram illustrating a format conversion executed in the case where no division has been performed.

FIG. 18 illustrates a format conversion executed in the case where no division has been performed. Where no division is carried out, the output signal Da1 has a line arrangement as shown in FIG. 18.

In the following explanation, it is assumed that one frame consists of 480 lines, and in the drawings, the line numbers of odd fields are shown in braces while the line numbers of even fields are shown in parentheses.

The output signal Da1 from the first divided/processed signal storing means 43a is converted in a manner such that the odd lines are output first, followed by the even lines. In this case, the output signal Db1 from the second divided/processed signal storing means 43b is ignored.

Figure 19:
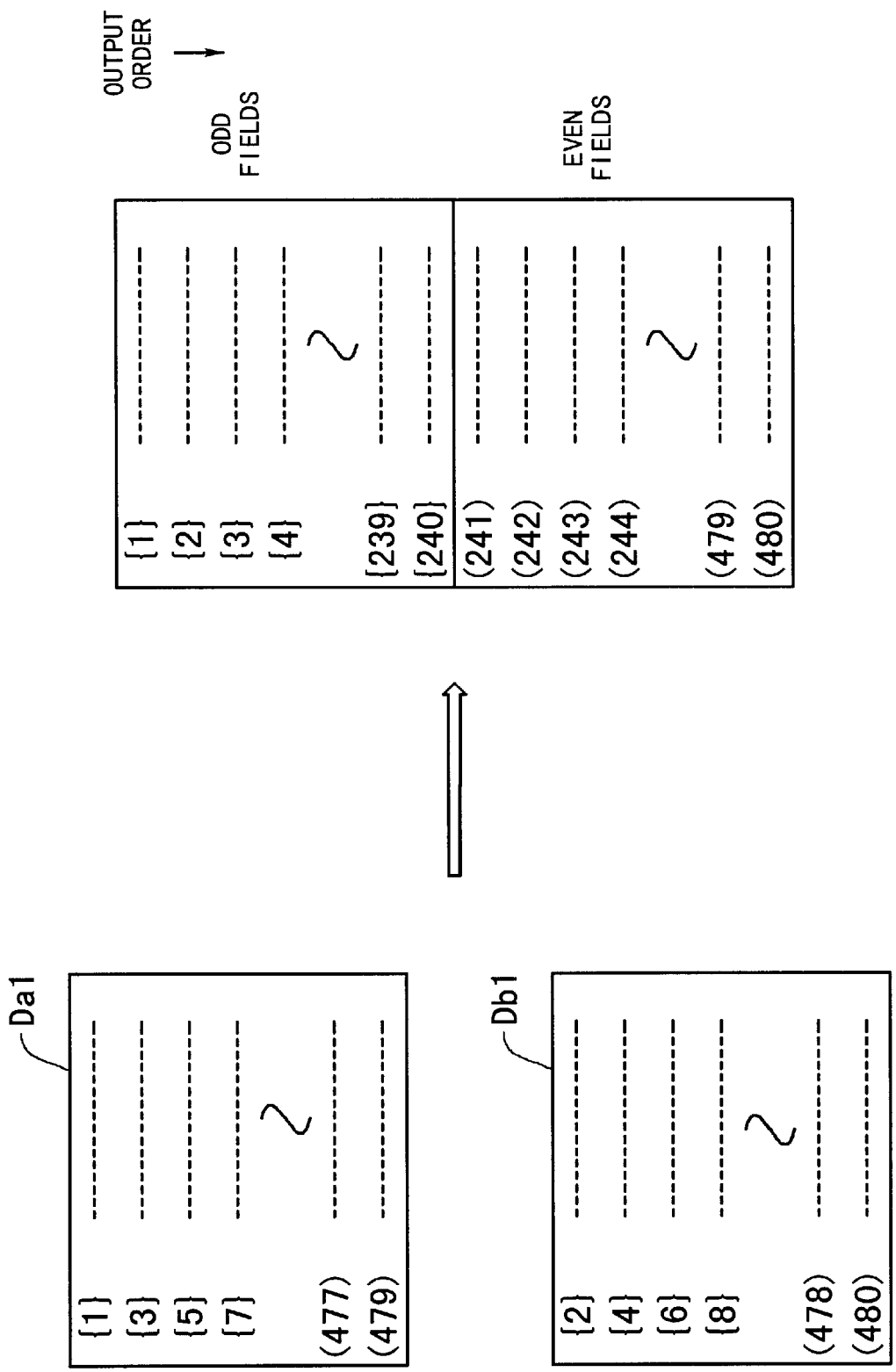
FIG. 19 is a diagram illustrating a format conversion executed in the case where division has been performed line by line.

FIG. 19 illustrates a format conversion executed in the case where division has been performed line by line. Where the odd fields are divided line by line and then the even fields are divided line by line, the output signals Da1 and Db1 have respective line arrangements shown in the figure.

The output signal Da1 from the first divided/processed signal storing means 43a and the output signal Db1 from the second divided/processed signal storing means 43b are alternately output on a line-by-line basis.

Figure 20:
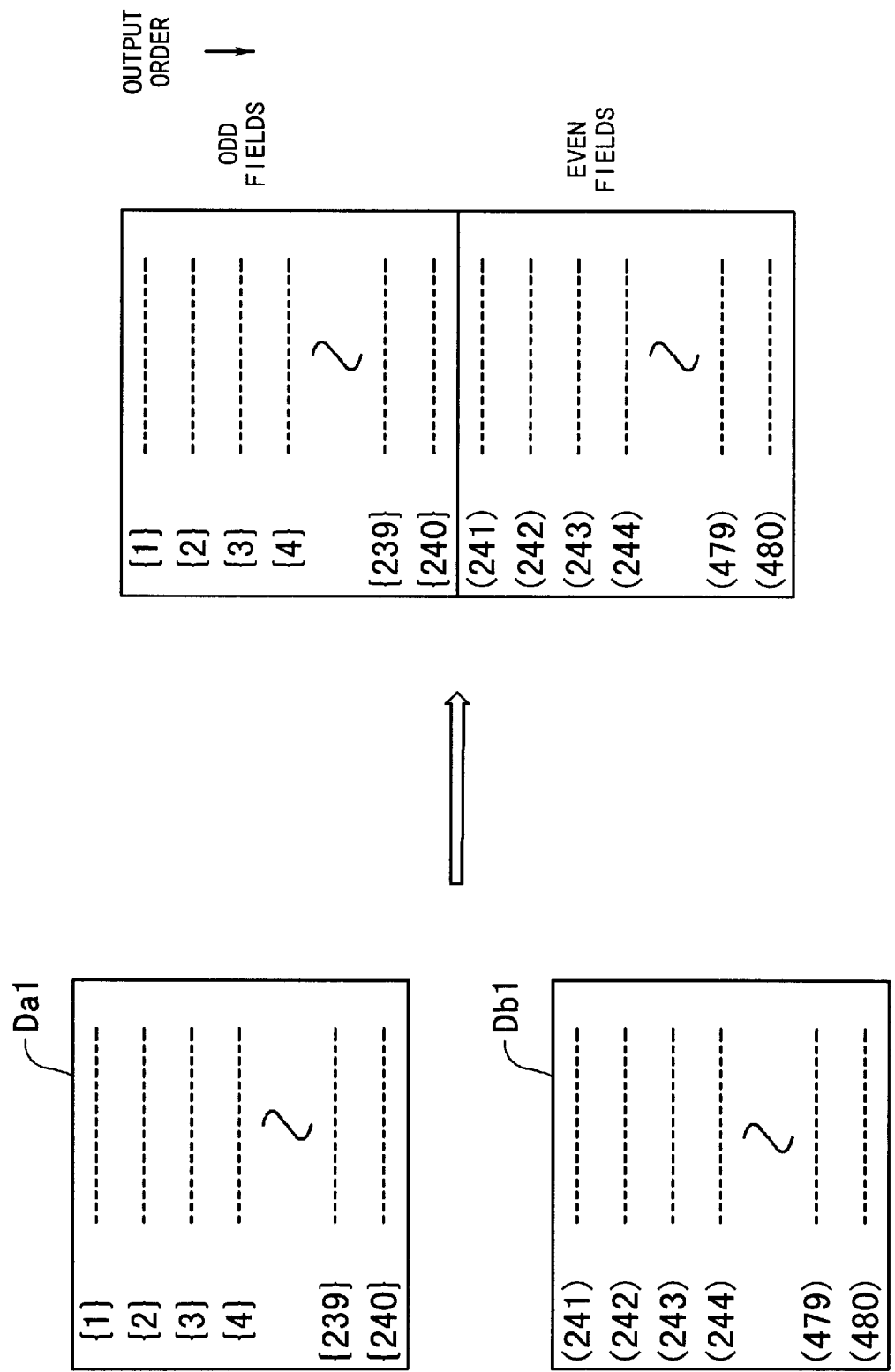
FIG. 20 is a diagram illustrating a format conversion executed in the case where division has been performed according to odd and even fields.

FIG. 20 illustrates a format conversion executed in the case where division has been performed according to odd and even fields. The output signal Da1 from the first divided/processed signal storing means 43a is output, and then the output signal Db1 from the second divided/processed signal storing means 43b is output and synthesized.

Figure 21:
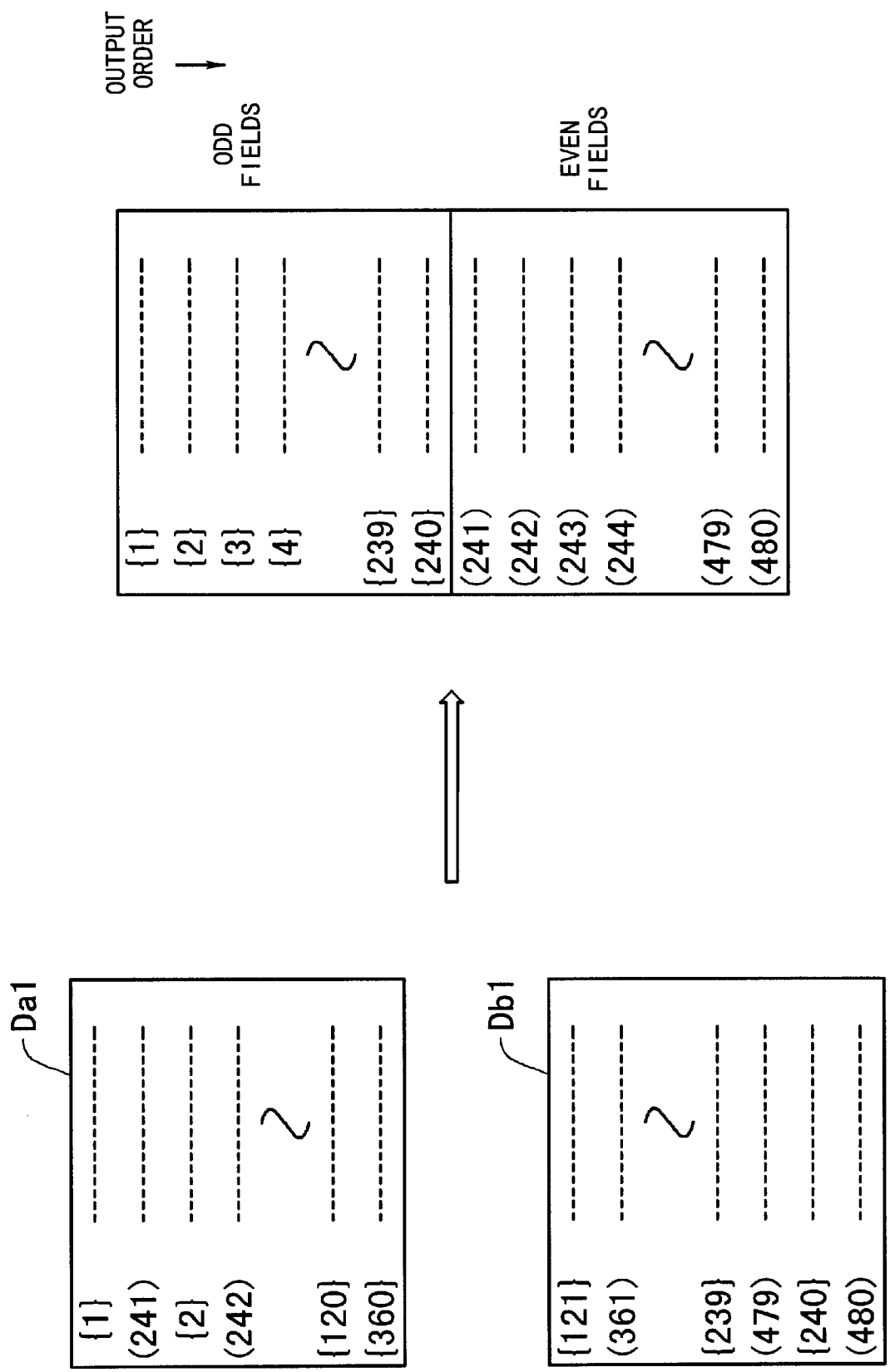
FIG. 21 is a diagram illustrating a format conversion executed in the case where a screen corresponding to one frame has been divided up and down.

FIG. 21 illustrates a format conversion executed in the case where a screen corresponding to one frame has been divided up and down. The odd lines of the output signals Da1 and Db1 from the first and second divided/processed signal storing means 43a and 43b are output first, and then the even lines of the signals Da1 and Db1 are output.

Instead of performing the format conversions described above, only one of the output signals Da1 and Db1 may be directly output. Specifically, one of the output signals Da1 and Db1 from the first and second divided/processed signal storing means 43a and 43b may be output line by line.

As described above, the image processing device 4 according to the fourth embodiment has a construction such that the two divided/processed signals are stored respectively in the first and second divided/processed signal storing means 43a and 43b each having a double-buffering structure, and that the synthesis and format conversion of the output signals Da1 and Db1 from the storing means 43a and 43b are performed by means of hardware. This makes it possible to perform the format conversion on a real-time basis at the time of image synthesis.

Figure 22:
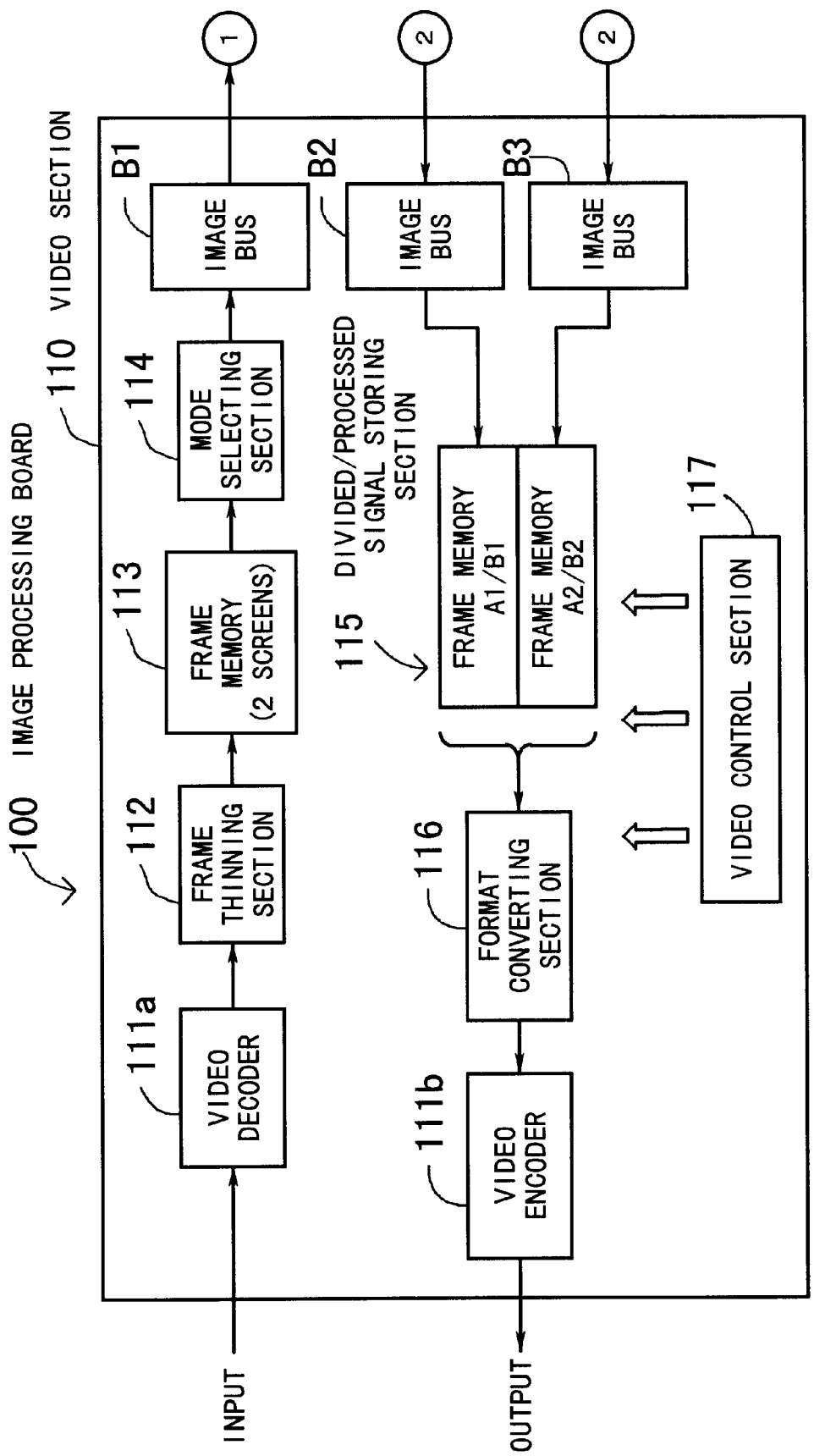
FIG. 22 is a diagram showing a video section of an image processing board.
Figure 23:
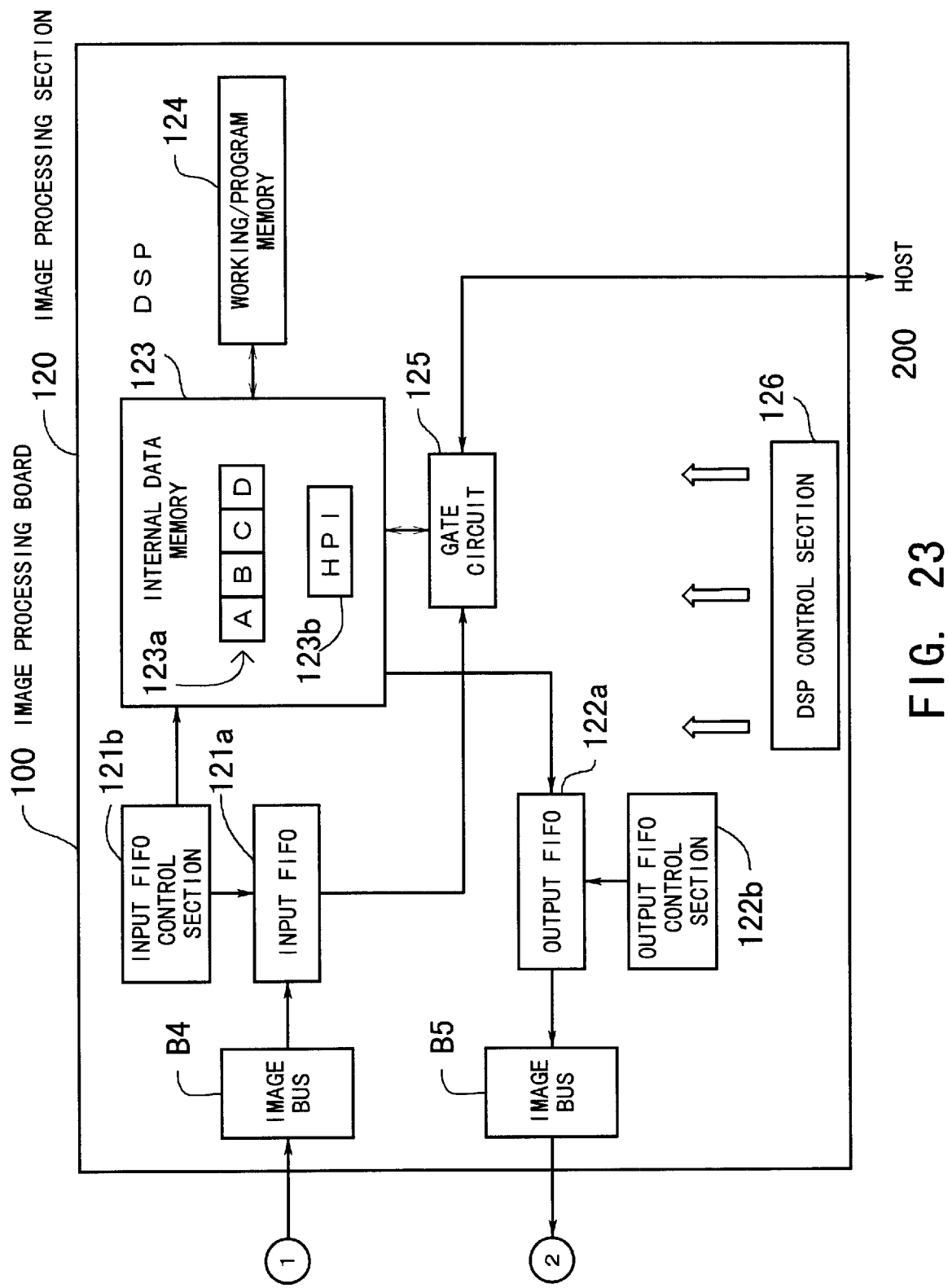
FIG. 23 is a diagram showing an image processing section of the image processing board.

Referring now to FIGS. 22 and 23, an image processing board to which the image processing device according to the present invention is applied will be described. FIGS. 22 and 23 show a video section and an image processing section, respectively, of the image processing board. An image processing board 100 comprises a video section 110 and an image processing section 120.

A video decoder 111a performs A/D conversion of a video input to the video section 110, and a video encoder 111b performs D/A conversion of an output from the video section 110 and outputs the processed signal.

A frame memory 113 alternately stores two screens of digital image data which has been subjected to frame thinning at a frame thinning section 112.

A mode selecting section 114 selects a format according to which the image data stored in the frame memory 113 is to be output to an image bus Bi, that is, it selects a normal 1/30 second-interval output mode, a frame thinning output mode and a line interval expansion output mode, and outputs the image data according to the selected modes.

A divided/processed signal storing section 115 stores two series of image data from image buses B2 and B3 in such a manner that two screens are alternately stored in each of frame memories A1/B1 and A2/B2.

A format converting section 116 carries out format conversion through line-by-line selection of the image data output from the divided/processed signal storing section 115.

A video control section 117 controls the individual processing sections constituting the video section 110.

In the image processing section 120, one line of the image data from an image bus B4 is input to an input FIFO 121a.

An input FIFO control section 121b controls the input FIFO 121a and also sends a horizontal/vertical synchronization interrupt to a DSP 123.

An output FIFO 122a is supplied with one line of processed image data and outputs same to an image bus B5. An output FIFO control section 122b controls the output FIFO 122a.

The DSP 123 has an internal data memory 123a with multiple banks and an HPI 123b, and performs image processing.

A working/program memory 124 can be used for storing programs or as a working area or a frame memory A/B.

A gate circuit 125 switches a port for accessing the HPI 123b of the DSP 123 between the input FIFO 121a side and the host 200 side.

A DSP control section 126 controls the individual processing sections constituting the image processing section 120.

As seen from the above, the image processing board 100 to which the image processing device according to the present invention is applied is capable of high-speed detection of an object, reduction in the occurrences of conflict on the image buses, and high-speed image synthesis.

As described above, the image processing device according to the present invention is constructed such that, with the line intervals of an image signal expanded, line processing is performed according to pipeline control, whereby the image processing speed increases, making it possible to detect the presence of an object at high speed.

Also, in the image processing device according to the present invention, image processing is carried out with the use of the storage area control means which is connected to the input bus for controlling storage of the input image data and which is also connected to the output bus for controlling storage of the processed image data. This permits the input and output buses to be separated from each other, making it possible to eliminate the occurrence of conflicts and to improve the quality and reliability of the device.

Further, in the image processing device of the present invention, two divided/processed signals are respectively stored in the first and second divided/processed signal storing means each having a double-buffering structure, and the synthesis and format conversion of the output signals from the storing means are performed by means of hardware. This makes it possible to perform the format conversion at high speed at the time of image synthesis.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An image processing device for processing an image signal, comprising:
    line interval expanding means for expanding an interval between lines of two different frames of the image signal by an amount corresponding to a number of frames which have been thinned out from between the two different frames for real-time image recognition frame processing of the image signal, where the image signal comprises a sequence of frames produced in real time; and
    a plurality of image processing means for performing real-time image recognition line processing of the lines of which the interval has been expanded, according to pipeline control.

2. The image processing device according to claim 1, wherein said line interval expanding means outputs the image signal with the interval between lines thereof expanded after the image signal is stored in a frame memory having a double-buffering structure.

3. The image processing device according to claim 1, wherein said line interval expanding means outputs the image signal with the interval between lines thereof expanded after the image signal is stored in a FIFO capable of storing one frame.

4. The image processing device according to claim 1, wherein said image processing means performs the image recognition line processing and the image recognition frame processing in combination.

5. The device according to claim 1, wherein the image recognition line processing comprises at least one of masking, background differentiation, projection, binarization, and feature extraction.

6. An image processing device for processing an image signal, comprising:
    input image signal storing means for storing the image signal input thereto and outputting the stored image signal as input image data, where the image signal comprises a sequence of frames;
    image signal processing means for image recognition frame processing and image recognition line processing the input image data and generating processed image recognition data, where the line processing is on lines from frames in the sequence that are not subjected to the image recognition frame processing;
    output image signal storing means for storing the processed image data and outputting the stored data as output image data; and
    storage area control means including an input-side storage area connected to said input image signal storing means via an input bus and having a double-buffering structure such that when a storage section thereof is storing the input image data, another storage section thereof outputs the input image data stored therein to said image signal processing means, and
    an output-side storage area connected to said output image signal storing means via an output bus and having a double-buffering structure such that when a storage section thereof is storing the processed image data, another storage section thereof outputs the processed image data stored therein to said output image signal storing means.

7. The image processing device according to claim 6, wherein said image signal processing means and said storage area control means are incorporated in a single processor.

8. The image processing device according to claim 6, further comprising data switching control means for controlling switching between the input image data and setting data from a host, both transmitted to said image signal processing means, or controlling transmission of notification data from said image signal processing means to the host.

9. An image processing device for processing an image signal, comprising:
    input image signal storing means for storing the image signal input thereto and outputting the stored image signal in a time-divided manner as input image data, where the image signal comprises a sequence of frames;
    image signal processing means for image recognition frame processing and image recognition line processing the input image data in a time-divided manner to generate processed image recognition data, and outputting the processed image recognition data, where the line processing is on lines from frames in the sequence that are not subjected to the image recognition frame processing;
    output image signal storing means for storing the processed image recognition data and outputting the stored data as output image data;
    input image data storing means having a double-buffering structure such that when a storage section thereof is storing the input image data, another storage section thereof outputs the input image data stored therein to said image signal processing means; and
    input/output interface means serving as an input interface for the input image data input to said image signal processing means from said input image data storing means, and also as an output interface for the processed image data output from said image signal processing means to said output image signal storing means.

10. The image processing device according to claim 9, further comprising data switching control means for controlling switching between the input image data and setting data from a host, both transmitted to said image signal processing means, or controlling transmission of notification data from said image signal processing means to the host.

11. An image processing device for processing an image signal, comprising:
   image signal dividing means for dividing the image signal into divided signals, where the image signal comprises a sequence of frames;
   first processed signal generating means for image recognition frame processing one of the divided image signals and generating a first processed signal;
   second processed signal generating means for image recognition line processing another of the divided image signals and generating a second processed signal, where the line processing is on lines from frames in the sequence that are not subjected to the image recognition frame processing;
   first processed signal storing means having a double-buffering structure such that when a storage section thereof is storing the first processed signal, another storage section thereof outputs the first processed signal stored therein;
   second processed signal storing means having a double-buffering structure such that when a storage section thereof is storing the second processed signal, another storage section thereof outputs the second processed signal stored therein; and
   format converting means for synthesizing output signals from said first and second processed signal storing means by means of hardware to perform format conversion.

12. The image processing device according to claim 11, wherein said format converting means outputs, line by line, one of the output signals from said first and second processes signal storing means.

13. The image processing device according to claim 11, wherein said format converting means first outputs odd lines and then even lines of one of the output signals from said first and second processed signal storing means to perform the format conversion.

14. The image processing device according to claim 11, wherein said format converting means alternately outputs, line by line, the output signal from said first processed signal storing means and the output signal from said second processed signal storing means to perform the format conversion.

15. The image processing device according to claim 11, wherein said format converting means first outputs, line by line, the output signal from said first processed signal storing means and then outputs, line by line, the output signal from said second processed signal storing means to perform the format conversion.

16. The image processing device according to claim 11, wherein said format converting means first outputs odd lines and then even lines of both of the output signals from said first and second processed signal storing means to perform the format conversion.

17. An image processing device for processing an image signal, comprising:
   a line interval expanding unit expanding an interval between lines of two different frames of the image signal by an amount corresponding to a number of frames which have been thinned out from between the two different frames for real-time image recognition frame processing of the image signal, where the image signal comprises a sequence of frames produced in real time; and
   a plurality of image processing units performing real-time image recognition line processing of the lines of which the interval has been expanded, according to pipeline control, wherein the image recognition line processing comprises at least one of masking, background differentiation, projection, binarization, and feature extraction.

18. The image processing device according to claim 17, wherein the line interval expanding unit outputs the image signal with the interval between lines thereof expanded after the image signal is stored in a frame memory having a double-buffering structure.

19. The image processing device according to claim 17, wherein the line interval expanding unit outputs the image signal with the interval between lines thereof expanded after the image signal is stored in a FIFO capable of storing one frame.

20. The image processing device according to claim 17, wherein the image processing units perform the image recognition line processing and the image recognition frame processing in combination.

21. An image processing device for processing an image signal, comprising:
   an input image signal storing unit storing the image signal input thereto and outputting the stored image signal as input image data, where the image signal comprises a sequence of frames;
   a image signal processing unit performing image recognition frame processing and image recognition line processing on the input image data and generating processed image recognition data, where the line processing is on lines from frames in the sequence that are not subjected to the image recognition frame processing;
   an output image signal storing unit storing the processed image recognition data and outputting the stored data as output image data; and
   a storage area control unit including an input-side storage area connected to the input image signal storing unit via an input bus and having a double-buffering structure such that when a storage section thereof is storing the input image data, another storage section thereof outputs the input image data stored therein to the image signal processing unit, and
   an output-side storage area connected to the output image signal storing unit via an output bus and having a double-buffering structure such that when a storage section thereof is storing the processed image data, another storage section thereof outputs the processed image data stored therein to the output image signal storing unit.

22. The image processing device according to claim 21, wherein the image signal processing unit and the storage area control unit are incorporated in a single processor.

23. The image processing device according to claim 21, further comprising a data switching control unit controlling switching between the input image data and setting data from a host, both transmitted to the image signal processing unit, or controlling transmission of notification data from the image signal processing unit to the host.

24. An image processing device for processing an image signal, comprising:

an input image signal storing unit storing the image signal input thereto and outputting the stored image signal in a time-divided manner as input image data, where the image signal comprises a sequence of frames;

an image signal processing unit performing image recognition frame processing and image recognition line processing on the input image data in a time-divided manner to generate processed image recognition data, and outputting the processed image data, where the line processing is on lines from frames in the sequence that are not subjected to the image recognition frame processing;

an output image signal storing unit storing the processed image recognition data and outputting the stored data as output image data;

an input image data storing unit having a double-buffering structure such that when a storage section thereof is storing the input image data, another storage section thereof outputs the input image data stored therein to the image signal processing unit; and an input/output interface unit serving as an input interface for the input image data input to the image signal processing unit from the input image data storing unit, and also as an output interface for the processed image data output from the image signal processing unit to the output image signal storing unit.

25. The image processing device according to claim 24, further comprising a data switching control unit controlling switching between the input image data and setting data from a host, both transmitted to the image signal processing unit, or controlling transmission of notification data from the image signal processing unit to the host.

26. An image processing device for processing an image signal, comprising:

an image signal dividing unit dividing the image signal into divided signals, where the image signal comprises a sequence of frames;

a first processed signal generating unit performing image recognition frame processing on one of the divided image signals and generating a first processed signal;

a second processed signal generating unit performing image recognition line processing on another of the divided image signals and generating a second processed signal, where the line processing is on lines from frames in the sequence that are not subjected to the image recognition frame processing;

a first processed signal storing unit having a double-buffering structure such that when a storage section thereof is storing the first processed signal, another storage section thereof outputs the first processed signal stored therein;

a second processed signal storing unit having a double-buffering structure such that when a storage section thereof is storing the second processed signal, another storage section thereof outputs the second processed signal stored therein; and a format converting unit synthesizing output signals from the first and second processed signal storing units by means of hardware to perform format conversion.

27. The image processing device according to claim 26, wherein the format converting unit outputs, line by line, one of the output signals from the first and second processed signal storing units.

28. The image processing device according to claim 26, wherein the format converting unit first outputs odd lines and then even lines of one of the output signals from the first and second processed signal storing units to perform the format conversion.

29. The image processing device according to claim 26, wherein the format converting unit alternately outputs, line by line, the output signal from the first processed signal storing unit and the output signal from the second processed signal storing unit to perform the format conversion.

30. The image processing device according to claim 26, wherein the format converting unit first outputs, line by line, the output signal from the first processed signal storing unit and then outputs, line by line, the output signal from the second processed signal storing unit to perform the format conversion.

31. The image processing device according to claim 26, wherein the format converting unit first outputs odd lines and then even lines of both of the output signals from the first and second processed signal storing units to perform the format conversion.

32. A method for real-time detection of objects or events within frames received from an imaging device that captures frames in real-time, comprising:

receiving a sequence of frames from the camera;

storing the sequence of frames in a buffer;

isolating a first frame in the buffer by thinning out a subsequence of frames between the first frame and a second frame;

generating an expanded line comprising lines from the series of thinned out frames which are stored in the buffer;

detecting objects or events within the first frame by processing the first frame in a first pipeline having a frame-based image recognition processing stages; and detecting objects and events within the expanded line by processing the expanded line in a second pipeline having line based image recognition processing stages.

* * * * *